US012064984B2

(12) United States Patent
Usui et al.

(10) Patent No.: US 12,064,984 B2
(45) Date of Patent: Aug. 20, 2024

(54) PRINTED MATTER PRODUCING METHOD AND PRINTED MATTER PRODUCING APPARATUS, AND PRINTED MATTER

(71) Applicants: Yuuma Usui, Kanagawa (JP); Mikiko Takada, Kanagawa (JP); Yukio Fujiwara, Kanagawa (JP)

(72) Inventors: Yuuma Usui, Kanagawa (JP); Mikiko Takada, Kanagawa (JP); Yukio Fujiwara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 146 days.

(21) Appl. No.: 17/597,722

(22) PCT Filed: Jun. 1, 2020

(86) PCT No.: PCT/JP2020/021508
§ 371 (c)(1),
(2) Date: Jan. 20, 2022

(87) PCT Pub. No.: WO2021/014763
PCT Pub. Date: Jan. 28, 2021

(65) Prior Publication Data

US 2022/0258517 A1 Aug. 18, 2022

(30) Foreign Application Priority Data

Jul. 23, 2019 (JP) ................................ 2019-135564
May 1, 2020 (JP) ................................ 2020-081430

(51) Int. Cl.
*B41M 5/00* (2006.01)
*B41M 7/00* (2006.01)

(52) U.S. Cl.
CPC ................................ *B41M 7/0081* (2013.01)

(58) Field of Classification Search
CPC .............. B41M 5/0017; B41M 5/0011; B41M 5/0023; B41M 5/0041; B41M 5/0047;
(Continued)

(56) References Cited

U.S. PATENT DOCUMENTS 9,193,142 B1 * 11/2015 Moorlag .................... B41J 2/01
11,332,932 B2 5/2022 Okada et al.
(Continued)

FOREIGN PATENT DOCUMENTS

EP 1905611 A2 4/2008
JP 2002-200841 7/2002
(Continued)

OTHER PUBLICATIONS

Kawai, Machine TranslationofJP-2017125089-A, 2017 (Year: 2017).*
(Continued)

*Primary Examiner* — Scott A Richmond
(74) *Attorney, Agent, or Firm* — Grüneberg and Myers PLLC

(57) ABSTRACT

A printed matter producing method includes forming an intermediate layer over a base material; applying an ink receiving layer forming liquid to the intermediate layer to form an ink receiving layer; and applying an ink to the ink receiving layer by an inkjet method to form an image. The viscosity of the ink receiving layer forming liquid at 25 degrees C. is 40 mPa·s or higher.

19 Claims, 1 Drawing Sheet

(58) Field of Classification Search
CPC .. B41M 5/0058; B41M 5/0064; B41M 5/007; B41M 5/0076; B41M 5/0355; B41M 5/0356; B41J 11/0015; B41J 3/4078; B41J 3/413
See application file for complete search history.

(56) References Cited

U.S. PATENT DOCUMENTS

| | | | | |
|---|---|---|---|---|
| 2008/0311299 | A1 * | 12/2008 | Furukawa | B41M 5/0017 118/46 |
| 2013/0065024 | A1 | 3/2013 | Aruga et al. | |
| 2017/0058140 | A1 * | 3/2017 | Imamura | H10K 71/135 |
| 2017/0297354 | A1 | 10/2017 | Van Den Bergen et al. | |
| 2019/0375225 | A1 * | 12/2019 | Mizushima | B41M 3/008 |
| 2019/0375944 | A1 | 12/2019 | Goto et al. | |

FOREIGN PATENT DOCUMENTS

| | | | |
|---|---|---|---|
| JP | 2004174948 | A * | 6/2004 |
| JP | 2005-53141 | | 3/2005 |
| JP | 2007-98686 | | 4/2007 |
| JP | 2008-68453 | | 3/2008 |
| JP | 2008-105377 | | 5/2008 |
| JP | 2008-105382 | | 5/2008 |
| JP | 2011-230501 | | 11/2011 |
| JP | 2012-87504 | | 5/2012 |
| JP | 2012-111822 | | 6/2012 |
| JP | 2017-013506 | | 1/2017 |
| JP | 2017125089 | A * | 7/2017 |
| JP | 2017-180018 | | 10/2017 |
| JP | 2018-079638 | | 5/2018 |
| JP | 2018-140629 | | 9/2018 |
| JP | 2019-77090 | | 5/2019 |
| WO | WO2016/066531 | A1 | 5/2016 |
| WO | 2018/159576 | | 9/2018 |

OTHER PUBLICATIONS

Hatada, Machine TranslationofJP-2004174948-A, 2004 (Year: 2004).*

International Search Report Issued Sep. 15, 2020 for counterpart international Patent Application No. PCT/JP2020/021508 filed Jun. 1, 2020.

Written Opinion Issued Sep. 15, 2020 for counterpart International Patent Application No. PCT/JP2020/021508 filed Jun. 1, 2020.

Minoru Tsubota, "An outline of Coating Methods", Journal of Japanese Soc. Colour Material, vol. 85, No. 1, 2012, pp. 32-38, with partial English translation of Table 1.

Japanese Submission of Publications for Japanese Patent Application No. 2020-081430, dated Jun. 27, 2023, 7 pages with English translation.

Japanese Office Action dated Dec. 19, 2023, in Japanese Application No. 2020-081430, 3 pages.

Japanese Publication Submission dated Mar. 5, 2024, in Japanese Application No. 2020-081430, with English translation, 15 pages.

* cited by examiner

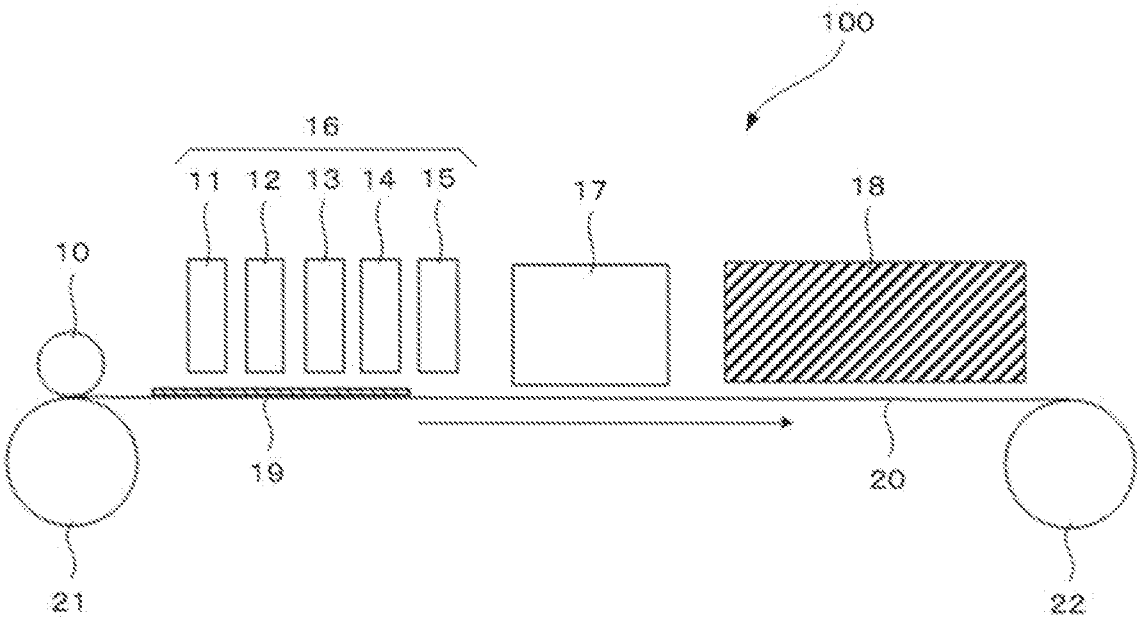
100
16
11
12
13
14
15
17
18
10
19
20
21
22

PRINTED MATTER PRODUCING METHOD AND PRINTED MATTER PRODUCING APPARATUS, AND PRINTED MATTER

CROSS-REFERENCE TO RELATED APPLICATIONS

This application is the National Stage entry under § 371 of International Application No. PCT/JP2020/021508, filed on Jun. 1, 2020, and which claims the benefit of priority to Japanese Application No. 2019-135564, filed on Jul. 23, 2019; and to Japanese Application No. 2020-081430, filed on May 1, 2020. The content of each of these applications is hereby incorporated by reference in its entirety.

BACKGROUND OF THE INVENTION

Technical Field

The present disclosure relates to a printed matter producing method and a printed matter producing apparatus, and a printed matter.

DESCRIPTION OF RELATED ART

In recent years, inkjet digital printing has been used for printing over not only paper but also, resins, metals, glass, wooden materials, and composite materials of these materials.

Particularly, attempts have been made into printing over, for example, resin films, resin-impregnated paper, and wooden boards (MDF boards, particle boards, and veneer boards), which are base materials used for flooring, wall materials, and packaging materials. For printing over these materials, not only solvent inks, but also from the viewpoint of VOC-free, water-based latex inks and UV inks have been used. Moreover, from the viewpoint of a low drying energy, and quality and safety, EB inks that do not need ink additives such as photopolymerization initiators have been used.

For example, proposed methods apply a second active-energy-ray curable liquid containing a colorant over a first active-energy-ray-curable liquid by an inkjet method, to form an image (for example, see PTLs 1 and 2).

SUMMARY OF INVENTION

Technical Problem

The present disclosure has an object to provide a printed matter producing method that provides a dropped ink with excellent wettability and spreadability over a base material varied in surface conditions, can suppress dot image quality degradation due to, for example, coalescing and color-mixing of dropped inks, and can produce a printed matter having a high robustness.

Solution to Problem

According to one aspect of the present disclosure, a printed matter producing method includes an intermediate layer forming step of forming an intermediate layer over a base material, an ink receiving layer forming step of applying an ink receiving layer forming liquid to the intermediate layer to form an ink receiving layer, and an image forming step of applying an ink to the ink receiving layer by an inkjet method to form an image. The viscosity of the ink receiving layer forming liquid at 25 degrees C. is 40 mPa·s or higher.

Advantageous Effects of Invention

The present disclosure can provide a printed matter producing method that provides a dropped ink with excellent wettability and spreadability over a base material varied in surface conditions, can suppress dot image quality degradation due to, for example, coalescing and color-mixing of dropped inks, and can produce a printed matter having a high robustness.

BRIEF DESCRIPTION OF DRAWINGS

The Figure is a concept diagram illustrating an example of a printed matter producing apparatus as described.

DESCRIPTION OF EMBODIMENTS (Printed Matter Producing Method and Printed Matter Producing Apparatus)

A printed matter producing method of the present disclosure includes an intermediate layer forming step of forming an intermediate layer over a base material, an ink receiving layer forming step of applying an ink receiving layer forming liquid to the intermediate layer to form an ink receiving layer, an image forming step of applying an ink to the ink receiving layer by an inkjet method to form an image, and a curing step of curing the ink receiving layer and the image. The viscosity of the ink receiving layer forming liquid at 25 degrees C. is 40 mPa·s or higher. The printed matter producing method further includes other steps as needed.

A printed matter producing apparatus of the present disclosure includes an intermediate layer forming unit configured to form an intermediate layer over a base material, an ink receiving layer forming unit configured to apply an ink receiving layer forming liquid to the intermediate layer to form an ink receiving layer, and an image forming unit configured to apply an ink to the ink receiving layer by an inkjet method to form an image. The viscosity of the ink receiving layer forming liquid at 25 degrees C. is 40 mPa·s or higher. The printed matter producing apparatus further includes other units as needed.

The printed matter producing method of the present disclosure can be suitably performed using the printed matter producing apparatus of the present disclosure. The intermediate layer forming step can be suitably performed by the intermediate layer forming unit. The ink receiving layer forming step can be suitably performed by the ink receiving layer forming unit. The other steps can be suitably performed by the other units.

The present inventors have obtained the following finding as a result of studies into a printed matter producing method that provides a dropped ink with excellent wettability and spreadability over a base material varied in surface conditions, can suppress dot image quality degradation due to, for example, coalescing and color-mixing of dropped inks, and can produce a printed matter having a high robustness.

In inkjet printing over resin films, resin-impregnated paper, and wooden boards, existing techniques have a problem that image qualities may vary depending on the base materials used (particularly, depending on the surface conditions of the base materials, or the surface conditions of, for example, ink receiving layers previously provided over the surface of the base materials). Particularly, spread of ink droplet dot gain, and coalescing and color-mixing of adjoining ink liquid droplets significantly depend on the surface conditions of the base materials (or the surface conditions of ink receiving layers formed over the surface of the base materials). Relationship between image qualities and surface parameters such as roughness, surface energy, permeability, and impermeability that express the surface conditions has not been completely elucidated, and it has been impossible to satisfy at the same time, both of securing ink droplet dot gain and suppressing coalescing/color-mixing of adjoining ink liquid droplets over a base material. Hence, sufficient image qualities have not been obtained. There is another problem relating to robustness, because a base material and an image (ink) have a weak adhesiveness with each other and the image is peeled by rubbing or scratching.

The present inventors have found that an intermediate layer provided over the surface of the base material for homogenization of the surface conditions (for example, surface roughness and wettability) of the base material enables stable image qualities irrespective of the kind of the base material. Moreover, the present inventors have found that an ink receiving layer and an image formed over the intermediate layer using an ink receiving layer forming liquid and an ink that have specific properties enable a good wettability and spreadability of the ink and consequent saving of the amount of the ink used. Furthermore, with the intermediate layer provided and with the ink receiving layer and an image formed using the ink receiving layer forming liquid and an ink that have specific properties, it is possible to partially bury the ink in the ink receiving layer that has a uniform film thickness (average thickness) irrespective of the kind of the base material, and to suppress mutual coalescing of ink dots due to wetting and spreading. The present inventors have found that ink wetting and spreading that occur while avoiding mutual coalescing of ink dots enable a high-definition, high-resolution, high-quality image having a high color developing uniformity, and also enable the effects of suppressing a streak due to discharging disorder and suppressing color-mixing, which is bleeding of a color over another color.

<Intermediate Layer Forming Step and Intermediate Layer Forming Unit>

The intermediate layer forming step is a step of forming an intermediate layer over a base material.

The intermediate layer forming unit is a unit configured to form an intermediate layer over a base material.

The intermediate layer forming step can be suitably performed by the intermediate layer forming unit.

—Base Material—

The base material is not particularly limited and may be appropriately selected depending on the intended purpose. Examples of the base material include resin films, sheets such as resin-impregnated paper, synthetic paper formed of synthetic fiber, natural paper, and nonwoven fabric, cloths, leather, wooden materials, metallic sheets, and glass plates.

Examples of the resin films include: polyester films; polypropylene films; polyethylene films; plastic films of nylon, vinylon, and acrylic; and pasted products of these films.

The resin films are not particularly limited and may be appropriately selected depending on the intended purpose. In terms of strength, uniaxially or biaxially stretched resin films are preferable.

Examples of the nonwoven fabric include nonwoven fabric formed of polyethylene fibers sprinkled in a sheet shape and thermocompression-bonded with each other to obtain a sheet shape.

Examples of the wooden materials include plywoods such as MDF, HDF, particle boards, and veneers, and decorative laminates having sheets pasted over the surfaces. The average thickness of the wooden materials is preferably 2 mm or greater but 30 mm or less.

Examples of the glass plates include float glass, colored glass, tempered glass, wire glass, ground glass, frosted glass, and mirror glass. The average thickness of the glass plates is preferably 0.3 mm or greater but 20 mm or less.

—Intermediate Layer—

The intermediate layer is not particularly limited and may be appropriately selected depending on the intended purpose so long as the intermediate layer can homogenize the surface conditions (for example, surface roughness and wettability) of the base material and an ink receiving layer described below can be formed over the surface of the intermediate layer.

The surface conditions (for example, surface roughness and wettability) of the base material vary from base material to base material. When the ink receiving layer forming liquid is applied directly to the base material, the outermost surface of the ink receiving layer may not become uniform. For example, when a wooden material is used as the base material, the wooden material may have an unsmooth surface and a high absorbability, and a liquid may not wet and spread adequately over the wooden material. With the intermediate layer provided over the base material, a uniform ink receiving layer can be formed over a base material that may be varied in surface conditions. As a result, printed matters to be produced can be prevented from being varied in the image quality and in the image depending on the difference of the kinds of the base materials used.

For example, for buildings, there are cases where images formed over resin films as the base materials of the printed matters and images formed over wooden materials as the base materials of the printed matters are arranged adjacently. When images over different base materials are arranged adjacently and turn out to have discordance between each other, the images cannot be appropriately joined to each other.

According to the present disclosure, it is possible to suppress discordance between images and differences in image qualities depending on the base materials, and to form printed matters that do not feel strange.

Furthermore, with the intermediate layer provided, it is possible to improve adhesiveness of the ink receiving layer with the base material.

The material of the intermediate layer is not particularly limited and may be appropriately selected depending on the intended purpose. Example of the material of the intermediate layer include urethane resins, (meth)acrylic resins, (meth)acrylic-urethane copolymer resins, urethane-based resins containing acrylic polyol as a main component, vinyl chloride-vinyl acetate copolymers, polyester resins, butyral resins, chlorinated polypropylene, and chlorinated polyethylene. Examples of the material of the intermediate layer also include materials obtained by dissolving these materials in solvents such as methyl ethyl ketone, dioxane, hexane, ethyl acetate, and butyl acetate (solvent-type resins). Examples of commercially available solvent-type resins include FINETACK CT-3088, CT-3850, CT-5020, CT-5030, and CT-6030, and QUICKMASTER SPS-900-LV, SPS-945NT, and SPS-1040NT-25 (available from DIC Corporation).

Examples of the material of the intermediate layer also include resin emulsions obtained by dispersing, for example, acrylic-based resins, vinyl acetate-based resins, styrenebutadiene-based resins, vinyl chloride-based resins, acrylic-styrene-based resins, butadiene-based resins, styrene-based resins, and epoxy-based resins in aqueous dispersion media such as water. The volume average particle diameter of these resin components is not particularly limited so long as the resin components form emulsions, and is preferably 150 nm or less and more preferably 5 nm or greater but 100 nm or less. Examples of commercially available resin emulsions include BONCOAT W-26 and W-386 (available from DIC Corporation).

It is preferable that the material of the intermediate layer contain an active-energy-ray-curable liquid and a resin powder.

Examples of the active-energy-ray-curable liquid include the same component as used in the ink receiving layer forming liquid described below.

Examples of the resin powder include crosslinked acrylic particles and crosslinked methacrylic particles. Examples of commercially available products of the resin powder include crosslinked acrylic monodispersed particles MX-100 (available from Soken Chemical & Engineering Co., Ltd.), crosslinked methacrylic particles TOUGHTIC AR650 (available from Japan Exlan Company, Limited). Examples of a sheet used as a method for lamination include hot melt films. Examples commercially available products of the sheet include KURANBETER (available from Kurabo Industries Ltd., polyolefin-based, polyester-based, and polyurethane-based).

For example, the average thickness of the intermediate layer is preferably 0.1 micrometers or greater but 5 micrometers or less and more preferably 0.5 micrometers or greater but 3 micrometers or less.

The method for forming the intermediate layer over the base material is not particularly limited and may be appropriately selected depending on the intended purpose. The material described above as is, or the material described above dissolved or dispersed in a solvent may be applied by, for example, a known printing method or applying method, dried, and cured. Examples of the method for forming the intermediate layer include a method of applying over the base material, a liquid constituting the material of the intermediate layer, or a liquid in which a resin is dissolved or dispersed, and subsequently drying the solvent to form the intermediate layer, and a method of applying a liquid constituting the material of the intermediate layer, and subsequently irradiating and curing the material with active energy rays to form the intermediate layer. Examples of other methods include a method of laminating an adhesive sheet as the intermediate layer, and a method of applying a resin powder and fixing the resin powder by thermocompression bonding.

The method for applying a liquid, a melt, or a powder serving as the component of the intermediate layer over the base material (the intermediate layer forming unit) is not particularly limited and may be appropriately selected depending on the intended purpose. Examples of the method include applying methods such as knife coating, nozzle coating, die coating, lip coating, comma coating, gravure coating, rotary screen coating, reverse roll coating, roll coating, spin coating, kneader coating, bar coating, blade coating, casting, dipping, and curtain coating, and spray, dispensers, and inkjet.

When forming an intermediate layer, it is possible to apply to the base material, treatment for facilitating adhesion, such as corona discharge treatment, plasma treatment, chromium oxidation treatment, flame treatment, hot air treatment, and ozone/ultraviolet treatment, to improve adhesiveness between the base material and the ink receiving layer.

<Ink Receiving Layer Forming Step and Ink Receiving Layer Forming Unit>

The ink receiving layer forming step is a step of applying an ink receiving layer forming liquid to the intermediate layer to form an ink receiving layer.

The ink receiving layer forming unit is a unit configured to apply an ink receiving layer forming liquid to the intermediate layer to form an ink receiving layer.

The ink receiving layer forming step can be suitably performed by the ink receiving layer forming unit.

—Ink Receiving Layer Forming Liquid—

The ink receiving layer forming liquid is a liquid for forming an ink receiving layer for receiving an ink described below, contains a polymerizable compound, preferably contains a polymerization initiator, a polymerization accelerator, a surfactant, and a pigment, and further contains other components as needed.

In the present disclosure, the viscosity of the ink receiving layer forming liquid at 25 degrees C. is 40 mPa·s or higher, and preferably 40 mPa·s or higher but 20,000 mPa·s or lower. When the viscosity of the ink receiving layer forming liquid at 25 degrees C. is 40 mPa·s or higher, it is possible to improve an effect of suppressing shift of landed dots (shift of ink dots from desired landing positions, this tends to occur at a low viscosity).

The viscosity can be measured with, for example, a rheometer MCR301 available from Anton Paar GmbH at a shear rate of 10/s at a 25 degrees C. using a cone plate CP25-1.

The static surface tension $\gamma_1$ of the ink receiving layer forming liquid at 25 degrees C. is preferably 60 mN/m or lower, and more preferably 40 mN/m or lower.

When the static surface tension of the ink receiving layer forming liquid is in the numerical range described above, an ink can wet and spread over the surface of the ink receiving layer.

The static surface tension can be measured with, for example, an automatic surface tensiometer DY-300 available from Kyowa Interface Science, Inc. according to a plate method and a ring method.

A difference ($\gamma_1-\gamma_2$) between the static surface tension $\gamma_1$ of the ink receiving layer forming liquid and the static surface tension $\gamma_1$ of an ink described below at 25 degrees C. is preferably −20 mN/m or higher but 20 mN/m or lower and more preferably −10 mN/m or higher but 10 mN/m or lower.

It is preferable that $\gamma_1<\gamma_2$ be satisfied, because whole (or at least a part) of a dot formed of an ink can be confined in the ink receiving layer, making it possible to form a printed matter having resistance to rubbing or scratching.

It is preferable that $\gamma_1\geq\gamma_2$ be satisfied, because it is possible to improve wettability and spreadability of a dropped ink in a suitable manner.

Examples of the polymerizable compound include monomers or oligomers that contain in a molecular structure thereof, a functional group such as a vinyl group, an acryloyl group, or a methacryloyl group, i.e., monofunctional monomers containing one functional group, multifunctional monomers containing one or more functional groups, multifunctional oligomers, and by the kind of the molecular structure, urethane acrylate oligomers, epoxy acrylate oligomers, and polyester acrylate oligomers.

Examples of the monofunctional monomers include γ-butyrolactone (meth)acrylate, isobornyl (meth)acrylate, formalized trimethylolpropanemono(meth)acrylate, trimethylolpropane(meth)acrylic acid benzoic acid ester, (meth) acryloylmorpholine, 2-hydroxypropyl (meth)acrylamide, N-vinylcaprolactam, N-vinylpyrrolidone, N-vinylformamide, cyclohexanedimethanolmonovinylether, hydroxyethylvinylether, diethyleneglycolmonovinylether, dicyclopentadienevinylether, tricyclodecanevinylether, benzylvinylether, ethyloxetanemethylvinylether, hydroxybutylvinylether, ethylvinylether, ethoxy(4)nonylphenol (meth)acrylate, benzyl (meth)acrylate, and caprolactone (meth)acrylate. One of these monofunctional monomers may be used alone or two or more of these monofunctional monomers may be used in combination.

Examples of the multifunctional monomers include ethyleneglycol di(meth)acrylate, hydroxypivalic acid neopentylglycol di(meth)acrylate, polytetramethyleneglycol di(meth)acrylate, diethyleneglycol di(meth)acrylate, triethyleneglycol di(meth)acrylate, tetraethyleneglycol di(meth)acrylate, polyethyleneglycol dimethacrylate [$CH_2$═CH—CO—($OC_2H_4$)n-OCOCH ═$CH_2$ (n≈9), the same (n≈14), and the same (n≈23)], dipropyleneglycol di(meth)acrylate, triproyleneglycol di(meth)acrylate, polypropyleneglycol dimethacrylate [$CH_2$═C($CH_3$)—CO—$(OC_3H_6)_n$—OCOC($CH_3$)═$CH_2$ (n≈7)], 1,3-butanediol di(meth)acrylate, 1,4-butanediol di(meth)acrylate, 1,6-hexanediol di(meth)acrylate, 1,9-nonanediol di(meth)acrylate, neopentylglycol di(meth)acrylate, tricyclodecanedimethanol di(meth)acrylate, propylene oxide-modified bisphenol A di(meth)acrylate, polyethyleneglycol di(meth) acrylate, dipentaerythritol hexa(meth)acrylate, propylene oxide-modified tetramethylolmethane tetra(meth)acrylate, dipentaerythritol hydroxypenta(meth)acrylate, caprolactone-modified dipentaerythritol hydroxpenta(meth)acrylate, ditrimethylolpropane tetra(meth)acrylate, pentaerythritol tetra(meth)acrylate, trimethylolpropane tri(meth)acrylate, ethylene oxide-modified trimethylolpropane tri(meth)acrylate, propylene oxide-modified trimethylolpropane tri(meth) acrylate, caprolactone-modified trimethylolpropane tri (meth)acrylate, pentaerythritol tri(meth)acrylate, tris(2-hydroxyethyl)isocyanurate tri(meth)acrylate, ethoxylated neopentylglycol di(meth)acrylate, propylene oxide-modified neopentylglycol di(meth)acrylate, propylene oxide-modified glyceryl tri(meth)acrylate, polyester di(meth)acrylate, polyester tri(meth)acrylate, polyester tetra(meth) acrylate, polyester penta(meth)acrylate, polyester poly (meth)acrylate, polyurethane di(meth)acrylate, polyurethane tri(meth)acrylate, polyurethane tetra(meth)acrylate, polyurethane penta(meth)acrylate, polyurethane poly(meth)acrylate, triethyleneglycoldivinyl ether, cyclohexanedimethanoldivinyl ether, diethyleneglycoldivinyl ether, triethyleneglycoldivinyl ether, and ethoxylated (4) bisphenol di(meth)acrylate. One of these multifunctional monomers may be used alone or two or more of these multifunctional monomers may be used in combination.

A monofunctional monomer and a multifunctional monomer, or a monofunctional monomer and a multifunctional oligomer may be combined as a mixture composition. In this case, from the viewpoint of robustness, the content of the multifunctional monomer or the multifunctional oligomer is preferably 50% by mass or greater relative to the total amount of the ink receiving layer forming liquid.

The polymerization initiator needs at least to be able to produce active species such as radicals and cations in response to energy such as an active energy ray or heat and initiate polymerization of the ink receiving layer forming liquid. As the polymerization initiator, one alone, or two or more in combination may be used among known radical polymerization initiators, cationic polymerization initiators, and base generators. Among these initiators, radical polymerization initiators are preferable. The content of the polymerization initiator is preferably 1% by mass or greater but 20% by mass or less relative to the total amount of the ink receiving layer forming liquid in order to achieve a sufficient curing speed.

Examples of the radical polymerization initiators include aromatic ketones, acylphosphine oxide compounds, aromatic onium salt compounds, organic peroxides, thio compounds (e.g., thioxanthone compounds and thiophenyl group-containing compounds), hexaaryl bimidazole compounds, ketoxime ester compounds, borate compounds, azinium compounds, metallocene compounds, active ester compounds, compounds containing a carbon-halogen bond, and alkylamine compounds.

The polymerization accelerator is not particularly limited and may be appropriately selected depending on the intended purpose. Examples of the polymerization accelerator include amine compounds such as trimethylamine, methyldimethanolamine, triethanolamine, p-diethylaminoacetophenone, ethyl p-dimethylaminobenzoate, p-dimethylaminobenzoic acid-2-ethylhexyl, N,N-dimethylbenzylamine, and 4,4'-bis(diethylamino)benzophenone. The content of the polymerization accelerator is not particularly limited and may be appropriately set depending on the polymerization initiator used and the content of the polymerization initiator.

The surfactant is not particularly limited and may be appropriately selected depending on the intended purpose. Examples of the surfactant include: glycerin fatty acid esters such as glycerin fatty acid ester, sorbitan fatty acid ester, polyethylene glycol fatty acid ester, glyceryl monostearate, glyceryl monooleate, diglyceryl monostearate, and diglyceryl monoisostearate; glycol fatty acid esters such as propylene glycol monostearate; sorbitan fatty acid esters such as sorbitan monostearate and sorbitan monooleate; and sucrose stearic acid ester, POE(4.2) laurylether, POE(40) hydrogenated castor oil, POE(10) cetylether, POE(9) laurylether, POE(10) oleylether, POE(20) sorbitan monooleate, POE(6) sorbit monolaurate, POE(15) cetylether, POE(20) sorbitan monopalmitate, POE(15) oleylether, POE(100) hydrogenated castor oil, POE(20) POP(4) cetylether, POE (20) cetylether, POE(20) oleylether, POE(20) stearylether, POE(50) oleylether, POE(25) cetylether, POE(25) laurylether, POE(30) cetylether, and POE(40) cetylether. One of these surfactants may be used alone or two or more of these surfactants may be used in combination.

The content of the surfactant is preferably 0.1% by mass or greater but 2% by mass or less relative to the total amount of the ink receiving layer forming liquid.

Examples of the pigment include white pigments, metal powder pigments, pearlescent pigments, and fluorescent pigments.

Examples of the white pigments include titanium dioxide, aluminum oxide, calcium carbonate, magnesium carbonate, calcium sulfate, barium sulfate, silica sand, clay, talc, and silicas.

The other components are not particularly limited and may be appropriately selected depending on the intended purpose. Examples of the other components include organic solvents, thickeners, dispersants, deodorants, ultraviolet screeners, antibacterial agents, and corrosion inhibitors.

As the preparing method, the ink receiving layer forming liquid can be prepared by mixing the various components described above, and the preparation devices and conditions are not particularly limited. For example, the ink receiving layer forming liquid can be prepared by subjecting, for example, the polymerizable monomer, the pigment, and the dispersant to a dispersion treatment using a dispersing machine such as a ball mill, a kitty mill, a disk mill, a pin mill, and a DYNO-MILL to prepare a pigment liquid dispersion, and further mixing the pigment liquid dispersion with, for example, a polymerizable monomer, an initiator, a polymerization inhibitor, and a surfactant.

The method for applying the ink receiving layer forming liquid over the base material is not particularly limited and may be appropriately selected depending on the intended purpose. Examples of the method include applying methods such as knife coating, nozzle coating, die coating, lip coating, comma coating, gravure coating, rotary screen coating, reverse roll coating, roll coating, spin coating, kneader coating, bar coating, blade coating, casting, dipping, and curtain coating, and inkjet.

The average thickness of the ink receiving layer after cured is not particularly limited and may be appropriately selected depending on the intended purpose so long as a printed matter having a stable high image quality and robustness can be obtained irrespective of the kind of the base material, and for example, is preferably 1 micrometer or greater but 100 micrometers or less and more preferably 2 micrometers or greater but 10 micrometers or less. When the average thickness of the ink receiving layer after cured is 1 micrometer or greater but 100 micrometers or less, spread of ink dots applied can be improved.

As the method for obtaining the average thickness of the ink receiving layer after cured, the ink receiving layer after cured may be scraped off at different five positions, and the height of each scraped portion from the base material to the surface of the ink receiving layer may be measured with, for example, a laser microscope VK-X100 available from Keyence Corporation, to calculate the average. The average thickness of the intermediate layer is removed from the obtained average. In this way, the average thickness of the ink receiving layer can be obtained.

Before forming the ink receiving layer, it is preferable to apply surface treatment such as corona treatment to the intermediate layer to improve coating film uniformity of the ink receiving layer.

<Image Forming Step and Image Forming Unit>

The image forming step is a step of applying an ink to the ink receiving layer by an inkjet method to form an image.

The image forming unit is a unit configured to apply an ink to the ink receiving layer by an inkjet method to form an image.

The image forming step can be suitably performed by the image forming unit.

In the present disclosure, "image" encompass all matters printed with the ink (for example, letters, shapes, symbols, photographic images, and solid images).

In the image forming step, the ink is applied to the surface of the ink receiving layer.

—Ink—

The ink contains a polymerizable compound, preferably contains a polymerization initiator and a colorant, and further contains other components as needed.

—Polymerizable Compound—

As the polymerizable compounds, the same polymerizable compounds as used in the ink receiving layer forming liquid can be used.

It is preferable that the polymerizable compound in the ink contain a monofunctional monomer and a multifunctional monomer.

—Polymerization Initiator—

As the polymerization initiator, the same polymerization initiators as used in the ink receiving layer forming liquid can be used.

—Colorant—

As the colorant, various pigments that apply colors of black, magenta, cyan, yellow, green, orange, purple, and white, and gloss colors such as gold and silver may be used depending on the intended purpose and requisite properties of the ink in the preset disclosure.

The content of the colorant is not particularly limited and may be appropriately determined in consideration of, for example, a desired color density and dispersibility in the ink, and is preferably 0.1% by mass or greater but 20% by mass or less relative to the total amount of the ink.

As the colorant, inorganic pigments and organic pigments may be used. One of these pigments may be used alone or two or more of these pigments may be used in combination.

As the inorganic pigment, for example, carbon black (C.I. pigment black 7) such as furnace black, lamp black, acetylene black, and channel black, iron oxide, and titanium oxide can be used.

Examples of the organic pigment include azo-pigments such as insoluble azo-pigments, condensed azo pigments, azo lake, and chelate azo-pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic dye chelates and acid dye chelates), dye lake (for example, basic dye lake and acid dye lake), nitro pigments, nitroso pigments, and aniline black.

The ink may further contain a dispersant in order to improve the dispersibility of the pigments.

The dispersant is not particularly limited. Examples of the dispersant include dispersants commonly used for preparing pigment dispersions such as polymeric dispersants.

The ink containing the colorant may be referred to as color ink (or may be simply referred to as ink), and the ink free of the colorant may be referred to as clear ink.

A region to which the ink (color ink) is discharged may be referred to as image region, and a region to which the clear ink is discharged may be referred to as non-image region.

It is preferable to discharge the clear ink or form dots of the clear ink in other than an image region formed of the ink (i.e., in a non-image region) or at least about the boundary between an image region and a non-image region. By discharging the clear ink or forming dots of the clear ink in other than an image region formed of the ink (i.e., in a non-image region) or at least about the boundary between an image region and a non-image region, it is possible to improve an effect of suppressing ink bleed at edges of an image.

—Other Components—

The other components are not particularly limited and may be appropriately selected depending on the intended purpose. Examples of the other components include organic solvents, surfactants, polymerization inhibitors, leveling agents, defoamants, fluorescent brighteners, permeation promotors, wetting agents (humectants), fixing agents, viscosity stabilizers, corrosion inhibitors, preservatives, antioxidants, and ultraviolet absorbents.

If possible, it is preferable to spare the organic solvent. A composition free of a volatile organic solvent (volatile organic compounds (VOC)-free composition) enhances safety at where the composition is handled and makes it possible to prevent pollution of the environment Incidentally, the "organic solvent" represents a conventional nonreactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1% by mass.

As the method for preparing the ink, the ink can be prepared by using the components described above. The preparation devices and conditions are not particularly limited. For example, the ink can be prepared by subjecting, for example, a polymerizable monomer, a pigment, and a dispersant to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization inhibitor, and a surfactant.

The static surface tension $\gamma_2$ of the ink at 25 degrees C. is not particularly limited and is preferably 20 mN/m or higher but 100 mN/m or lower, preferably 40 mN/m or lower, and more preferably 30 mN/m or lower. When the static surface tension $\gamma_2$ of the ink at 25 degrees C. is 20 mN/m or higher but 100 mN/m or lower, a dropped ink can wet and spread desirably. The static surface tension of the ink at 25 degrees C. is particularly preferably 20 mN/m or higher but 40 mN/m or lower, because wettability and spreadability of a dropped ink can be improved.

The viscosity of the ink used in the present disclosure is not particularly limited and may be appropriately selected depending on the intended purpose so long as the ink can be discharged through nozzles of an inkjet head. The viscosity of the ink at a temperature during discharging is preferably 3 mPa·s or higher but 40 mPa·s or lower, more preferably 5 mPa·s or higher but 15 mPa·s or lower, and yet more preferably 6 mPa·s or higher but 12 mPa·s or lower.

The driving method of a discharging head used in the inkjet method may be a method using PZT as a piezoelectric element actuator, a method of applying thermal energy, a method employing an on-demand head using an electrostatic force-applied actuator, and a method employing a continuous jet-type charge control-type head.

As the ink, there may be three, four, or more kinds of inks depending on the colorant (pigment) contained, and each ink is applied using a separate inkjet head. Alternatively, only one head including a plurality of nozzle lines may be used, for the different kinds of inks to be discharged from different nozzle lines. Depending on what image resolution is needed and how many times of scanning is needed, the head nozzle density needed varies from color to color. The head nozzle density is, for example, 240 npi (nozzle per inch), 300 npi, 600 npi, and 1,200 npi.

The volume per liquid droplet of the ink discharged from the inkjet head is preferably 1 pL or greater but 50 pL or less and more preferably 2 pL or greater but 15 pL or less. When the volume per liquid droplet of the ink discharged from the inkjet head is 1 pL or greater but 50 pL or less, undesirable coalescing and color-mixing, and color gamut reduction can be suppressed.

The discharging speed of a liquid droplet of the ink is preferably 5 m/s or higher but 15 m/s or lower, and more preferably 7 m/s or higher but 10 m/s or lower. When the discharging speed of a liquid droplet of the ink is 5 m/s or higher but 15 m/s or lower, the ink can be discharged stably.

The dot density (image resolution) of liquid droplets discharged is preferably 240 dpi×240 dpi (dot per inch) or higher.

The overlap between the periods of time during which the plurality of inks, for example, a black ink, a cyan ink, a magenta ink, and a yellow ink are discharged respectively (i.e., a time lag between timings at which respective inks land on the same position) is preferably as short as possible, preferably within 1 second, and more preferably within 0.5 seconds.

The order of applying or discharging the ink receiving layer forming liquid, the ink (here, a color ink), and a clear ink similar to the ink but free of a colorant is any of the following (A) and (B).

(A) The order of the ink receiving layer forming liquid, the ink, and the clear ink (B) The order of the ink receiving layer forming liquid, the clear ink, and the ink The overlap between the periods of time during which the ink and the clear ink are discharged respectively is preferably as short as possible, and preferably within 1 second.

The average thickness of an image formed with the ink after the image is cured is not particularly limited, may be appropriately selected depending on the intended purpose, and is preferably 1 micrometer or greater but 20 micrometers or less and more preferably 1 micrometer or greater but 10 micrometers or less. The average thickness of an image formed with the clear ink is not particularly limited, may be appropriately selected depending on the intended purpose, and is preferably 1 micrometer or greater but 20 micrometers or less.

In the present disclosure, it is preferable to make the average thickness of an image formed with the ink smaller than the average thickness of the ink receiving layer formed with the ink receiving layer forming liquid. With the average thickness of an image formed with the ink smaller than the average thickness of the ink receiving layer formed with the ink receiving layer forming liquid, it is possible to bury the ink in the ink receiving layer forming liquid, and to obtain a printed matter having a high robustness as a result. The difference between the average thickness of the ink receiving layer formed with the ink receiving layer forming liquid and the average thickness of an image formed with the ink is preferably 100 micrometers or less.

Further, in the present disclosure, the sum of the average thickness of the ink receiving layer formed with the ink receiving layer forming liquid and the average thickness of an image formed with the ink is preferably 1 micrometer or greater but 100 micrometers or less. When the sum of the average thickness of the ink receiving layer formed with the ink receiving layer forming liquid and the average thickness of an image formed with the ink is 1 micrometer or greater but 100 micrometers or less, a printed matter having a stable high image quality and robustness can be obtained irrespective of the kind of the base material.

As the method for obtaining the average thickness, an ink layer (image) and the ink receiving layer after cured may be scraped off at different five positions, and the height of each scraped portion from the base material to the surface of the image (ink layer) may be measured with, for example, a laser microscope VK-X100 available from Keyence Corporation, to calculate the average. The average thickness of the intermediate layer and the average thickness of the ink receiving layer are removed from the obtained average. In this way, the average thickness of the image can be obtained.

<Other Steps and Other Units>

The other steps are not particularly limited and may be appropriately selected depending on the intended purpose. Examples of the other steps include a curing step, a heating step, an embossing step, and a bending step.

The other units are not particularly limited and may be appropriately selected depending on the intended purpose. Examples of the other units include a curing unit, a heating unit, an embossing unit, and a bending unit.

The other steps can be suitably performed by the other units.

<<Curing Step and Curing Unit>>

The curing step is a step of curing the ink receiving layer and the image (ink layer) by an external stimulus.

The curing unit is a unit configured to cure the ink receiving layer and the image (ink layer) by an external stimulus Through curing of the ink receiving layer and the image (ink layer), an integrated cured product can be obtained.

The external stimulus is not particularly limited and may be appropriately selected depending on the intended purpose. Examples of the external stimulus include active energy ray and heat.

Active energy rays are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

The curing conditions are not particularly limited and may be appropriately selected depending on the intended purpose. For ultraviolet rays, it is preferable to use an irradiator that can irradiate a target with ultraviolet rays at an intensity of 6 $W/cm^2$ or higher from an irradiation distance of 2 mm.

For electron beams, it is preferable to use an accelerating voltage that gives a dose of 15 kGy or higher at the farthest position from the electron beam irradiator used for curing.

It is preferable to perform the curing step within 10 seconds after the ink is discharged to the ink receiving layer. When the curing step is performed within 10 seconds, it is possible to suppress the image formed of the ink from being disordered.

When discharging the clear ink, performing the curing step within 10 seconds means performing the curing step within 10 seconds after the ink (color ink) and the clear ink are discharged.

<<Heating Step and Heating Unit>>

The heating step is a step of heating the ink receiving layer and the image (ink layer) before cured, to level the ink receiving layer and the image.

The heating unit is a unit configured to heat the ink receiving layer and the image (ink layer) before cured, to level the ink receiving layer and the image.

When performing the heating step, the heating step is performed before the curing step.

The heating unit is not particularly limited and may be appropriately selected depending on the intended purpose. Examples of the heating unit include an infrared heater and a hot air heater.

The heating temperature is, for example, preferably 40 degrees C. or higher but 100 degrees C. or lower. When the heating temperature is 40 degrees C. or higher but 100 degrees C. or lower, it is possible to suppress the image formed of the ink from being disordered.

<<Embossing Step and Embossing Unit>>

The embossing step is a step of forming a bossed-recessed pattern on a printed matter.

The embossing unit is a unit configured to form a bossed-recessed pattern on a printed matter.

In the embossing step, methods for, for example, embossing, chemical embossing, rotary screening, or flexographic printing typically used for imparting bosses and recesses to, for example, wall paper and decorative laminates may be appropriately selected and used.

Examples of the embossing unit include a unit configured to emboss a printed matter with a cooling roller after heating, and a unit configured to emboss a printed matter simultaneously with heating using heat roller embossing.

The embossing depth of embossing is preferably 0.08 mm or greater but 0.50 mm or less. When the embossing depth is 0.08 mm or greater, a three-dimensional appearance can be expressed. When the embossing depth is 0.50 mm or less, the abrasion resistance of the surface can be improved.

Examples of the shapes of the bossed recessed pattern formed by embossing include wood texture grooves, bosses and recesses over slate surface, cloth surface texture, satin, grey, hairline, and hatching pattern grooves.

A printed matter produced by a printed matter producing method of the present disclosure and a printed matter producing apparatus of the present disclosure is suitable for building material applications such as flooring, wallpaper, interior materials, wall materials, baseboard materials, ceiling materials, and pillars, because the method and apparatus can provide a dropped ink with excellent wettability and spreadability over the base material of the printed matter even if the base material is varied in surface conditions, can suppress image quality degradation due to, for example, coalescing and color-mixing of dropped inks, and can provide the printed matter with a high robustness.

The printed matter producing method of the present disclosure will be described in detail with reference to the drawings.

The Figure is a schematic view illustrating an example of the printed matter producing apparatus of the present disclosure. The printed matter producing apparatus 100 illustrated in the Figure includes a unit (unillustrated) configured to form an intermediate layer over a base material 19, a coating roller 10 configured to apply the ink receiving layer forming liquid (ink receiving layer) over the intermediate layer, a discharging head unit 16 including: a head 11 provided downstream of the coating roller 10 and configured to apply a clear ink by an inkjet method; and a plurality of heads provided further downstream and configured to apply inks (color inks) by an inkjet method, namely a head 12 for black, a head 13 for magenta, a head 14 for cyan, and a head 15 for yellow, a heater 17, and an active energy ray irradiator 18. In the Figure, the reference numeral 20 denotes a conveyor belt, the reference numeral 21 denotes a sending roller counter to the coating roller 10, and the reference numeral 22 denotes a winding roller. The base material 19 is conveyed in the direction of the arrow in the Figure with the conveyor belt 20 wound up by the winding roller 22.

First, an intermediate layer is formed over the surface of the base material. Subsequently, the ink receiving layer forming liquid (ink receiving layer) is applied by the coating roller 10.

Next, with the base material, over which the ink receiving layer has been formed, scanned at a predetermined speed, the head 11 for clear ink discharges the clear ink over a non-image region of the ink receiving layer in accordance with a reversed image pattern. Next, the plurality of heads for inks (head 12 for black, head 13 for magenta, head 14 for cyan, and head 15 for yellow) discharge black, magenta, cyan, and yellow inks over an image region of the ink receiving layer in accordance with an image pattern.

Next, after the heater 17 heats each liquid to level the liquid, the active energy ray irradiator 18 irradiates and cures the ink receiving layer, the inks, and the clear ink with active energy rays at a predetermined irradiation condition.

The printed matter producing apparatus has a configuration of a single-pass printer having an inkjet head-printable width that is greater than the width of the base material to which printing is performed, and configured to perform scanning once. Instead, the printed matter producing apparatus may have a configuration of a multi-pass printer having a head width smaller than the width of the base material and provided with a driving mechanism (head unit or base material conveying) that enables scanning more than once.

(Printed Matter)

A printed matter of the present disclosure is a printed matter produced by the printed matter producing method of the present disclosure, and includes the base material, the intermediate layer, and the ink receiving layer. The average thickness of the ink receiving layer after cured is greater than 15 micrometers. The printed matter further includes other members as needed.

The base material, the intermediate layer, and the ink receiving layer of the printed matter of the present disclosure are the same as in the description on the printed matter producing method and the printed matter producing apparatus of the present disclosure.

EXAMPLES

The present disclosure will be described below by way of Examples. The present disclosure should not be construed as being limited to these Examples. Unless particularly described, preparation and evaluation of samples were performed under conditions of 25 degrees C. and humidity of 60%.

<Preparation of Ink Receiving Layer Forming Liquid A>

2-Acryloyloxypropyl phthalic acid (obtained from Shin-Nakamura Chemical Co., Ltd.) (95 parts by mass), and OMNIRAD TPO (obtained from IGM Resins B.V.) (5 parts by mass) serving as an initiator were stirred, to prepare an ink receiving layer forming liquid A.

The static surface tension $\gamma_1$ of the ink receiving layer forming liquid A at 25 degrees C. was 39 mN/m and the viscosity of the ink receiving layer forming liquid A at 25 degrees C. was 16,000 mPa·s.

The static surface tension at 25 degrees C. was measured with an automatic surface tensiometer DY-300 obtained from Kyowa Interface Science, Inc. according to a plate method. The viscosity at 25 degrees C. was measured with a rheometer MCR301 obtained from Anton Paar GmbH at a shear rate of 10/s at 25 degrees C. using a cone plate CP25-1. In the following description, the static surface tension and the viscosity would be measured by the same methods as the methods for measuring the ink receiving layer forming liquid, except for changes of the temperature condition.

<Preparation of Clear Ink A0>

Phenoxyethyl acrylate (obtained from Tokyo Chemical Industry Co., Ltd.) (25 parts by mass), acryloylmorpholine (obtained from Tokyo Chemical Industry Co., Ltd.) (26 parts by mass), trimethylolpropaneethoxy triacrylate (obtained from Daicel-Allnex Ltd.) (42 parts by mass), OMNIRAD TPO (obtained from IGM Resins B.V.) (5 parts by mass) serving as an initiator, and SOLSPERSE 32000 (obtained from Lubrizol Corporation) (2 parts by mass) serving as a surfactant/dispersant were stirred, to prepare a clear ink A0.

The static surface tension $\gamma_2$ of the clear ink A0 at 25 degrees C. was 24 mN/m, and the viscosity of the clear ink A0 at 40 degrees C. was 8 mPa·s.

<Preparation of Black Ink A1>

Phenoxyethyl acrylate (obtained from Tokyo Chemical Industry Co., Ltd.) (25 parts by mass), acryloylmorpholine (obtained from Tokyo Chemical Industry Co., Ltd.) (26 parts by mass), trimethylolpropaneethoxy triacrylate (obtained from Daicel-Allnex Ltd.) (35 parts by mass), OMNIRAD TPO (obtained from IGM Resins B.V.) (5 parts by mass) serving as an initiator, SOLSPERSE 32000 (obtained from Lubrizol Corporation) (2 parts by mass) serving as a surfactant/dispersant, and SPECIAL BLACK 350 (a black pigment, obtained from BASF Japan Ltd.) (7 parts by mass) serving as a colorant were stirred, to prepare a black ink A1.

The static surface tension $\gamma_2$ of the black ink A1 at 25 degrees C. was 24 mN/m, and the viscosity of the black ink A1 at 40 degrees C. was 10 mPa·s.

<Preparation of Magenta Ink A2>

Phenoxyethyl acrylate (obtained from Tokyo Chemical Industry Co., Ltd.) (25 parts by mass), acryloylmorpholine (obtained from Tokyo Chemical Industry Co., Ltd.) (26 parts by mass), trimethylolpropaneethoxy triacrylate (obtained from Daicel-Allnex Ltd.) (35 parts by mass), OMNIRAD TPO (obtained from IGM Resins B.V.) (5 parts by mass) serving as an initiator, SOLSPERSE 32000 (obtained from Lubrizol Corporation) (2 parts by mass) serving as a surfactant/dispersant, and CINQUASIA MAGENTA RT-355-D (a magenta pigment, obtained from BASF Japan Ltd.) (7 parts by mass) serving as a colorant were stirred, to prepare a magenta ink A2.

The static surface tension $\gamma_2$ of the magenta ink A2 at 25 degrees C. was 24 mN/m, and the viscosity of the magenta ink A2 at 40 degrees C. was 10 mPa·s.

<Preparation of Cyan Ink A3>

Phenoxyethyl acrylate (obtained from Tokyo Chemical Industry Co., Ltd.) (25 parts by mass), acryloylmorpholine (obtained from Tokyo Chemical Industry Co., Ltd.) (26 parts by mass), trimethylolpropaneethoxy triacrylate (obtained from Daicel-Allnex Ltd.) (35 parts by mass), OMNIRAD TPO (obtained from IGM Resins B.V.) (5 parts by mass) serving as an initiator, SOLSPERSE 32000 (obtained from Lubrizol Corporation) (2 parts by mass) serving as a surfactant/dispersant, and IRGALITE BLUE GLVO (a cyan pigment, obtained from BASF Japan Ltd.) (40 parts by mass) serving a colorant were stirred, to prepare a cyan ink A3.

The static surface tension $\gamma_2$ of the cyan ink A3 at 25 degrees C. was 24 mN/m, and the viscosity of the cyan ink A3 at 40 degrees C. was 10 mPa·s.

<Preparation of Yellow Ink A4>

Phenoxyethyl acrylate (obtained from Tokyo Chemical Industry Co., Ltd.) (25 parts by mass), acryloylmorpholine (obtained from Tokyo Chemical Industry Co., Ltd.) (26 parts by mass), trimethylolpropaneethoxy triacrylate (obtained from Daicel-Allnex Ltd.) (35 parts by mass), OMNIRAD TPO (obtained from IGM Resins B.V.) (5 parts by mass) serving as an initiator, SOLSPERSE 32000 (obtained from Lubrizol Corporation) (2 parts by mass) serving as a surfactant/dispersant, and NOVOPERM YELLOW H2G (a yellow pigment, obtained from Clariant Corporation) (40 parts by mass) serving as a colorant were stirred, to prepare a yellow ink A4.

The static surface tension $\gamma_2$ of the yellow ink A4 at 25 degrees C. was 24 mN/m, and the viscosity of the yellow ink A4 at 40 degrees C. was 10 mPa·s.

Next, using the prepared ink receiving layer forming liquid A, clear ink A0, and black ink A1, magenta ink A2, cyan ink A3, and yellow ink A4 as color inks in the printed matter producing apparatus 100 illustrated in the Figure, a printed matter 1 was obtained in the manner described below.

As the discharging head unit 16, GEN5 heads obtained from Ricoh Industry Co., Ltd. (MH5420, 150 npi×4 lines, a model adapted to two colors) were used. That is, three heads in total, namely, one GEN5 head (adaptable to a dot density of 600 dpi) serving as the head 11 for clear ink, one GEN5 head (adaptable to a dot density of 300 dpi for each of black and magenta) serving as the head 12 for black and the head 13 for magenta, and one GEN5 head (adaptable to a dot density of 300 dpi for each of cyan and yellow) serving as the head 14 for cyan and the head 15 for yellow were arranged in this order in the base material conveying direction. Here, a position adjusting mechanism of the discharging head unit 16 made adjustment in a manner that the nozzle numbers of the respective GEN5 heads would depart by 10 micrometers or greater in the base material conveying direction.

The discharging head unit 16 was heated to 40 degrees C., to adjust a discharge drive waveform in a manner that printing could be performed with a liquid droplet amount of 7 pL at a liquid droplet speed of 7 m/s.

The clear ink was discharged at a discharge frequency at which the dot density would be 600 dpi. The color inks A1 to A4 were discharged at a discharge frequency at which the dot density of each ink would be 300 dpi in the base material conveying direction. The printing was performed at a base material conveying speed at which the discharge overlapping period of time among the clear ink to yellow ink (i.e., a landing time lag) would be 1 second.

Using a linear irradiation-type UV-LED light source GJ-75 obtained from Hamamatsu Photonics K. K. as the active energy ray irradiator 18, the base material was irradiated from a distance of 10 mm.

First, a 4-inch square glass plate (with a thickness of 0.7 mm) was used as the base material 19. Using a doctor blade applicator, BONCOAT W-26 (obtained from DIC Corporation) serving as an intermediate layer forming liquid was applied with a thickness of 50 micrometers over the surface of the base material, and subsequently dried for 30 minutes in an oven of 100 degrees C. Subsequently, using the coating roller 10, the ink receiving layer forming liquid A described above was applied in a manner the average thickness after curing would be 25 micrometers.

Next, with the base material scanned at a speed of 15 m/min, the clear ink A0 was discharged over a non-image region from the head 11 for clear ink with a liquid droplet amount of 7 pL. The average thickness of the clear ink coating film after cured was 4 micrometers. Next, the color inks A1 to A4 for black (B), magenta (M), cyan (C), and yellow (Y) described above were discharged from the head 12 for black, the head 13 for magenta, the head 14 for cyan, and the head 15 for yellow with a liquid droplet amount of 7 pL each. The average thickness of the color ink coating film was 4 micrometers.

Next, the ink receiving layer, the color inks, and the clear ink were cured with the active energy ray irradiator 18. The period of time taken from discharging of the yellow ink until curing was 10 seconds. Through the above process, a printed matter 1 was obtained.

Example 2

A printed matter 2 was obtained in the same manner as in Example 1, except that unlike in Example 1, the ink receiving layer forming liquid A was changed to an ink receiving layer forming liquid B described below.

<Preparation of Ink Receiving Layer Forming Liquid B>

2-Acryloyloxypropyl phthalic acid (obtained from Shin-Nakamura Chemical Co., Ltd.) (94.9 parts by mass), OMNIRAD TPO (obtained from IGM Resins B.V.) (5 parts by mass) serving as an initiator, and BYK-UV-3510 (obtained from BYK-Chemie GmbH) (0.1 parts by mass) serving as a surfactant were stirred, to prepare an ink receiving layer forming liquid B.

The static surface tension $\gamma_1$ of the ink receiving layer forming liquid B at 25 degrees C. was 29 mN/m, and the viscosity of the ink receiving layer forming liquid B at 25 degrees C. was 16,000 mPa·s.

Example 3

A printed matter 3 was obtained in the same manner as in Example 1, except that unlike in Example 1, the discharge drive waveform was adjusted to set the liquid droplet discharging speed of the clear ink A0 and the color inks A1 to A4 to 9 m/s.

Example 4

A printed matter 4 was obtained in the same manner as in Example 1, except that Unlike in Example 1, the discharge drive waveform was adjusted to set the liquid droplet volume of the clear ink A0 and the color inks A1 to A4 to 14 pL (with a coating film average film thickness of 8 micrometers).

Example 5

A printed matter 5 was obtained in the same manner as in Example 1, except that unlike in Example 1, the average thickness of the ink receiving layer A applied over the base material was changed to 50 micrometers.

Example 6

A printed matter 6 was obtained in the same manner as in Example 1, except that unlike in Example 1, GEN5 heads for minute liquid droplets (MH5220, 150 npi×4 lines) obtained from Ricoh Industry Co., Ltd., namely, a total of five GEN5 heads (each adaptable to a dot density of 600 dpi) for the head 11 for clear ink, the head 12 for black, the head 13 for magenta, the head 14 for cyan, and the head 15 for yellow were used as the discharging head unit 16, the discharge frequency was changed in a manner that the dot density of each would be 600 dpi in the base material conveying direction, and the liquid droplet volume was changed to 2.5 pL (with a coating film average thickness of 5.6 micrometers for color ink and 1.4 micrometers for clear ink).

Example 7

A printed matter 7 was obtained in the same manner as in Example 1, except that unlike in Example 1, the active energy ray irradiator 18 was changed to an electron beam irradiator EC300/30/30MA obtained from Iwasaki Electric Co., Ltd. An inert gas blanket of the electron beam irradiator EC300/30/30MA was coupled at a pressure of 0.2 MPa to a compressor-added $N_2$ gas generator (MAXI-FLOW 30, obtained from Inhouse Gas Co., Ltd.) as an inert gas source, to flow $N_2$ at a flow rate of from 2 L/min through 10 L/min to set the oxygen concentration to 500 ppm or lower. Electron beams were emitted for curing at the following irradiation conditions: an accelerating voltage of 30 kV and a dose of 30 kGy.

Example 8

A printed matter 8 was obtained in the same manner as in Example 1, except that unlike in Example 1, printing was performed at double the base material conveying speed for a section from the clear ink A0 to the yellow ink A4 in a manner that the discharge overlapping period of time among the clear ink A0 to yellow ink A4 (i.e., a landing time lag) would be 0.5 seconds.

Example 9

A printed matter 9 was obtained in the same manner as in Example 1, except that unlike in Example 1, printing was performed at double the base material conveying speed for a section from the yellow ink A4 to curing in a manner that the period of time taken from the yellow ink A4 until curing would be 5 seconds.

Example 10

A printed matter 10 was obtained in the same manner as in Example 1, except that unlike in Example 1, printing was performed in a manner that the period of time taken from the clear ink A0 until curing would be 5 seconds.

Example 11

A printed matter 11 was obtained in the same manner as in Example 1, except that unlike in Example 1, the order between the clear ink head and the color ink heads was reversed to discharge the color inks A1 to A4 and the clear ink A0 in this order.

Example 12

A printed matter 12 was obtained in the same manner as in Example 1, except that unlike in Example 1, the heater 17 was provided between the discharging head unit 16 and the active energy ray irradiator 18, to level an ink receiving layer and each ink before curing.

As the heater, a heater produced by combining LATEX BLOWER G SERIES obtained from Hitachi Industrial Equipment Systems Co., Ltd., a high hot air-generating electric heater XS-2 obtained from K. K. Kansai Dennetsu, and a high-blow nozzle 50AL obtained from K. K. Kansai Dennetsu and adjusting a wind speed from the nozzle tip to 2 m/sec was used.

Example 13

A printed matter 13 was obtained in the same manner as in Example 1, except that unlike in Example 1, an ink receiving layer forming liquid C described below was used instead of the ink receiving layer forming liquid A.

<Preparation of Ink Receiving Layer Forming Liquid C>

2-Acryloyloxyethyl succinate (obtained from Shin-Nakamura Chemical Co., Ltd.) (94.9 parts by mass), OMNIRAD TPO (obtained from IGM Resins B.V.) (5 parts by mass) serving as an initiator, and BYK-UV-3510 (obtained from BYK-Chemie GmbH) (0.1 parts by mass) serving as a surfactant were stirred, to prepare an ink receiving layer forming liquid C.

The static surface tension of the ink receiving layer forming liquid C at 25 degrees C. was 29 mN/m, and the viscosity of the ink receiving layer forming liquid C at 25 degrees C. was 160 mPa·s.

Example 14

A printed matter 14 was obtained in the same manner as in Example 1, except that unlike in Example 1, an ink receiving layer forming liquid D described below was used instead of the ink receiving layer forming liquid A.

<Preparation of Ink Receiving Layer Forming Liquid D>

2-Acryloyloxyethyl succinate (obtained from Shin-Nakamura Chemical Co., Ltd.) (90.9 parts by mass), OMNIRAD TPO (obtained from IGM Resins B.V.) (5 parts by mass) serving as an initiator, BYK-UV-3510 (obtained from BYK-Chemie GmbH) (0.1 parts by mass) serving as a surfactant, and a white pigment (4 parts by mass) were stirred, to prepare an ink receiving layer forming liquid D.

The static surface tension of the ink receiving layer forming liquid D at 25 degrees C. was 29 mN/m, and the viscosity of the ink receiving layer forming liquid D at 25 degrees C. was 300 mPa·s.

Example 15

A printed matter 15 was obtained in the same manner as in Example 1, except that unlike in Example 1, an ink receiving layer forming liquid E described below was used instead of the ink receiving layer forming liquid A.

<Preparation of Ink Receiving Layer Forming Liquid E>

A urethane acrylic oligomer CN968 (obtained from Sartomer Corporation) (47.5 parts by mass), 1,6-hexanediol diacrylate SR238F (obtained from Sartomer Corporation) (47.5 parts by mass), and OMNIRAD TPO (obtained from IGM Resins B.V.) (5 parts by mass) serving as an initiator were stirred, to prepare an ink receiving layer forming liquid E.

The static surface tension $\gamma_1$ of the ink receiving layer forming liquid E at 25 degrees C. was 32 mN/m, and the viscosity of the ink receiving layer forming liquid e at 25 degrees C. was 100 mPa·s.

Example 16

A printed matter 16 was obtained in the same manner as in Example 1, except that unlike in Example 1, an ink receiving layer forming liquid F described below was used instead of the ink receiving layer forming liquid A.

<Preparation of Ink Receiving Layer Forming Liquid F>

A urethane acrylic oligomer CN929 (obtained from Sartomer Corporation) (65.0 parts by mass), tripropylene glycol diacrylate SR306H (obtained from Sartomer Corporation) (30.0 parts by mass), and OMNIRAD TPO (obtained from IGM Resins B.V.) (5 parts by mass) serving as an initiator were stirred, to prepare an ink receiving layer forming liquid F.

The static surface tension $\gamma_1$ of the ink receiving layer forming liquid F at 25 degrees C. was 32 mN/m, and the viscosity of the ink receiving layer forming liquid F at 25 degrees C. was 3,500 mPa·s.

Example 17

A printed matter 17 was obtained in the same manner as in Example 1, except that unlike in Example 1, an ink receiving layer forming liquid G described below was used instead of the ink receiving layer forming liquid A.

<Preparation of Ink Receiving Layer Forming Liquid G>

A urethane acrylic oligomer CN975 (obtained from Sartomer Corporation) (95.0 parts by mass) and OMNIRAD TPO (obtained from IGM Resins B.V.) (5 parts by mass) serving as an initiator were stirred, to prepare an ink receiving layer forming liquid G.

The static surface tension $\gamma_1$ of the ink receiving layer forming liquid G at 25 degrees C. was 34 mN/m, and the viscosity of the ink receiving layer forming liquid G at 25 degrees c. was 10,700 mPa·s.

Example 18

A printed matter 18 was obtained in the same manner in Example 1, except that unlike in Example 1, an ink receiving layer forming liquid H described below was used instead of the ink receiving layer forming liquid A.

<Preparation of Ink Receiving Layer Forming Liquid H>

A urethane acrylic oligomer CN929 (obtained from Sartomer Corporation) (85.0 parts by mass), tripropylene glycol diacrylate SR306H (obtained from Sartomer Corporation) (10.0 parts by mass), and OMNIRAD TPO (obtained from IGM Resins B.V.) (5 parts by mass) serving as an initiator were stirred, to prepare an ink receiving layer forming liquid H.

The static surface tension $\gamma_1$ of the ink receiving layer forming liquid H at 25 degrees C. was 33 mN/m, and the viscosity of the ink receiving layer forming liquid H at 25 degrees C. was 20,000 mPa·s.

Example 19

A printed matter 19 was obtained in the same manner as in Example 1, except that unlike in Example 1, the base material was changed from the 4-inch square glass plate (with a thickness of 0.7 mm) to a white acrylic resin plate (ACRYLITE, obtained from Mitsubishi Chemical Corporation, a 10-cm square with a thickness of 2 mm), and the drying temperature and time of the intermediate layer were changed to 50 degrees C. for 24 time.

Example 20

A printed matter 20 was obtained in the same manner as in Example 1, except that unlike in Example 1, the base material was changed from the 4-inch square glass plate (with a thickness of 0.7 mm) to a MDF plate (N.P. wood, obtained from Sumitomo Forestry Co., Ltd., a 10-cm square with a thickness of 2.5 mm).

Example 21

A printed matter 21 was obtained in the same manner as in Example 1, except that unlike in Example 1, the base material was changed from the 4-inch square glass plate (with a thickness of 0.7 mm) to a decorative low pressure melamine laminate (obtained from Aica Kogyo Company, Limited, a 10-cm square with a thickness of 0.95 mm).

Example 22

A printed matter 22 was obtained in the same manner as in Example 1, except that unlike in Example 1, the base material was changed from the 4-inch square glass plate (with a thickness of 0.7 mm) to a veneer board (a 10-cm square with a thickness of 5.5 mm).

Example 23

A printed matter 22 was obtained in the same manner as in Example 1, except that unlike in Example 1, the base material was changed from the 4-inch square glass plate (with a thickness of 0.7 mm) to an aluminum plate (a 10-cm square with a thickness of 1 mm).

Example 24

A printed matter 24 was obtained in the same manner as in Example 1, except that unlike in Example 1, the discharge frequency was changed in a manner that each color was discharged with the timing to discharge shifted between the odd ordinal number nozzle line for the color and the even ordinal number nozzle line for the color by an amount corresponding to $300\times 2\sqrt{3}$ dpi for the dot density of each color to be $300\times\sqrt{3}/2$ dpi in the base material conveying direction, and the liquid droplet volume was changed to 9.6 pL (with a coating film average thickness of 4 micrometers for color ink).

Example 25

A printed matter 25 was obtained in the same manner as in Example 1, except that unlike in Example 1, the liquid droplet discharging speed was changed to 4 m/s.

Example 26

A printed matter 26 was obtained in the same manner as in Example 1, except that unlike in Example 1, the liquid droplet volume was changed to 4 pL.

Example 27

A printed matter 27 was obtained in the same manner as in Example 1, except that unlike in Example 1, the average thickness of the ink receiving layer was changed to 0.8 micrometers.

Example 28

A printed matter 28 was obtained in the same manner as in Example 1, except that unlike in Example 1, the dot density was changed to 150 dpi×150 dpi.

Example 29

A printed matter 29 was obtained in the same manner as in Example 1, except that unlike in Example 1, the ink receiving layer forming liquid A was changed to an ink receiving layer forming liquid I described below to have an average thickness of 5 micrometers, and the inks A0 to A4 were changed to inks J0 to J4 described below.

<Preparation of Ink Receiving Layer Forming Liquid I>

2-Acryloyloxypropyl phthalic acid (obtained from Shin-Nakamura Chemical Co., Ltd.) (94 parts by mass), OMNIRAD TPO (obtained from IGM Resins B.V.) (5 parts by mass) serving as an initiator, and BYK-UV-3510 (obtained from BYK-Chemie GmbH) (1 part by mass) serving as a surfactant were stirred, to prepare an ink receiving layer forming liquid I.

The static surface tension $\gamma_1$ of the ink receiving layer forming liquid I at 25 degrees C. was 25 mN/m, and the viscosity of the ink receiving layer forming liquid I at 25 degrees C. was 16,000 mPa·s.

<Preparation of Clear Ink J0>

Phenoxyethyl acrylate (obtained from Tokyo Chemical Industry Co., Ltd.) (25 parts by mass), acryloylmorpholine (obtained from Tokyo Chemical Industry Co., Ltd.) (26 parts by mass), trimethylolpropaneethoxy triacrylate (obtained from Daicel-Allnex Ltd.) (43.9 parts by mass), OMNIRAD TPO (obtained from IGM Resins B.V.) (5 parts by mass) serving as an initiator, SOLSPERSE 32000 (obtained from Lubrizol Corporation) (0.1 parts by mass) serving as a surfactant/dispersant were stirred, to prepare a clear ink J0.

The static surface tension $\gamma_2$ of the liquid at 25 degrees C. was 30 mN/m, and the viscosity of the liquid at 40 degrees C. was 8 mPa·s.

<Preparation of Black Ink J1>

Phenoxyethyl acrylate (obtained from Tokyo Chemical Industry Co., Ltd.) (25 parts by mass), acryloylmorpholine (obtained from Tokyo Chemical Industry Co., Ltd.) (26 parts by mass), trimethylolpropaneethoxy triacrylate (obtained from Daicel-Allnex Ltd.) (36.9 parts by mass), OMNIRAD TPO (obtained from IGM Resins B.V.) (5 parts by mass) serving as an initiator, SOLSPERSE 32000 (obtained from Lubrizol Corporation) (0.1 parts by mass) serving as a surfactant/dispersant, SPECIAL BLACK 350 (a black pigment, obtained from BASF Japan Ltd.) (7 parts by mass) serving as a colorant were stirred, to prepare a black ink J1.

The static surface tension $\gamma_2$ of the black ink J1 at 25 degrees C. was 30 mN/m, and the viscosity of the black ink J1 at 40 degrees C. was 10 mPa·s.

<Preparation of Magenta Ink J2>

Phenoxyethyl acrylate (obtained from Tokyo Chemical Industry Co., Ltd.) (25 parts by mass), acryloylmorpholine (obtained from Tokyo Chemical Industry Co., Ltd.) (26 parts by mass), trimethylolpropaneethoxy triacrylate (obtained from Daicel-Allnex Ltd.) (36.9 parts by mass), OMNIRAD TPO (obtained from IGM Resins B.V.) (5 parts by mass) serving as an initiator, SOLSPERSE 32000 (obtained from Lubrizol Corporation) (0.1 parts by mass) serving as a surfactant/dispersant, and CINQUASIA MAGENTA RT-355-D (a magenta pigment, obtained from BASF Japan Ltd.) (7 parts by mass) serving as a colorant were stirred, to prepare a magenta ink J2.

The static surface tension $\gamma_2$ of the magenta ink J2 at 25 degrees C. was 30 mN/m, and the viscosity of the magenta ink J2 at 40 degrees C. was 10 mPa·s.

<Preparation of Cyan Ink J3>

Phenoxyethyl acrylate (obtained from Tokyo Chemical Industry Co., Ltd.) (25 parts by mass), acryloylmorpholine (obtained from Tokyo Chemical Industry Co., Ltd.) (26 parts by mass), trimethylolpropaneethoxy triacrylate (obtained from Daicel-Allnex Ltd.) (36.9 parts by mass), OMNIRAD TPO (obtained from IGM Resins B.V.) (5 parts by mass) serving as an initiator, SOLSPERSE 32000 (obtained from Lubrizol Corporation) (0.1 parts by mass) serving as a surfactant/dispersant, and IRGALITE BLUE GLVO (a cyan pigment, obtained from BASF Japan Ltd.) (40 parts by mass) serving as a colorant were stirred, to prepare a cyan ink J3.

The static surface tension $\gamma_2$ of the cyan ink J3 at 25 degrees C. was 30 mN/m, and the viscosity of the cyan ink J3 at 40 degrees C. was 10 mPa·s.

<Preparation of Yellow Ink J4>

Phenoxyethyl acrylate (obtained from Tokyo Chemical Industry Co., Ltd.) (25 parts by mass), acryloylmorpholine (obtained from Tokyo Chemical Industry Co., Ltd.) (26 parts by mass), trimethylolpropaneethoxy triacrylate (obtained from Daicel-Allnex Ltd.) (36.9 parts by mass), OMNIRAD TPO (obtained from IGM Resins B.V.) (5 parts by mass) serving as an initiator, SOLSPERSE 32000 (obtained from Lubrizol Corporation) (0.1 parts by mass) serving as a surfactant/dispersant, NOVOPERM YELLOW H2G (a yellow pigment, obtained from Clariant Corporation) (40 parts by mass) serving as a colorant were stirred, to prepare a yellow ink J4.

The static surface tension $\gamma_2$ of the yellow ink J4 at 25 degrees C. was 30 mN/m, and the viscosity of the yellow ink J4 at 40 degrees C. was 10 mPa·s.

Example 30

A printed matter 30 was obtained in the same manner as in Example 29, except that unlike in Example 29, an ink receiving layer forming liquid K described below was used instead of the ink receiving layer forming liquid I.

<Preparation of Ink Receiving Layer Forming Liquid K>

2-Acryloyloxyethyl succinate (obtained from Shin-Nakamura Chemical Co., Ltd.) (94 parts by mass), OMNIRAD TPO (obtained from IGM Resins B.V.) (5 parts by mass) serving as an initiator, and BYK-UV-3510 (obtained form BYK-Chemie GmbH) (1 part by mass) serving as a surfactant were stirred, to prepare an ink receiving layer forming liquid K.

The static surface tension $\gamma_1$ of the ink receiving layer forming liquid K at 25 degrees C. was 25 mN/m, and the viscosity of the ink receiving layer forming liquid K at 25 degrees C. was 160 mPa·s.

Example 31

A printed matter 31 was obtained in the same manner as in Example 29, except that unlike in Example 29, an ink receiving layer forming liquid L described below was used instead of the ink receiving liquid forming liquid I.

<Preparation of Ink Receiving Layer Forming Liquid L>

A urethane acrylic oligomer CN929 (obtained from Sartomer Corporation) (64 parts by mass), tripropyleneglycol diacrylate SR306H (obtained from Sartomer Corporation) (30 parts by mass), OMNIRAD TPO (obtained from IGM Resins B.V.) (5 parts by mass) serving as an initiator, and BYK-UV-3510 (obtained from BYK-Chemie GmbH) (1 part by mass) serving as a surfactant were stirred, to prepare an ink receiving layer forming liquid L.

The static surface tension $\gamma_1$ of the ink receiving layer forming liquid L at 25 degrees C. was 24 mN/m, and the viscosity of the ink receiving layer forming liquid L at 25 degrees C. was 3,500 mPa·s.

Example 32

A printed matter 32 was obtained in the same manner as in Example 29, except that unlike in Example 29, an ink receiving layer forming liquid M described below was used instead of the ink receiving layer forming liquid I.

<Preparation of Ink Receiving Layer Forming Liquid M>

2-Acryloyloxyethyl succinate (obtained from Shin-Nakamura Chemical Co., Ltd.) (47 parts by mass), isobornyl acrylate SR506 (obtained from Sartomer Corporation) (47 parts by mass), OMNIRAD TPO (obtained from IGM Resins B.V.) (5 parts by mass) serving as an initiator, and BYK-UV-3510 (obtained form BYK-Chemie GmbH) (1 part by mass) serving as a surfactant were stirred, to prepare an ink receiving layer forming liquid M.

The static surface tension $\gamma_1$ of the ink receiving layer forming liquid M at 25 degrees C. was 24 mN/m, and the viscosity of the ink receiving layer forming liquid M at 25 degrees C. was 41 mPa·s.

Comparative Example 1

A printed matter 33 was obtained in the same manner as in Example 1, except that unlike in Example 1, the ink receiving layer A was not formed but the color inks A1 to A4 were discharged directly over the base material.

Comparative Example 2

A printed matter 34 was obtained in the same manner as in Example 1, except that unlike in Example 1, no intermediate layer was formed.

Comparative Example 3

A printed matter 35 was obtained in the same manner as in Example 1, except that unlike in Example 1, an ink receiving layer forming liquid N described below was used instead of the ink receiving layer forming liquid A.

<Preparation of Ink Receiving Layer Forming Liquid N>

Tripropyleneglycol diacrylate SR306H (obtained from Sartomer Corporation) (95 parts by mass), and OMNIRAD TPO (obtained from IGM Resins B.V.) (5 parts by mass) serving as an initiator were stirred, to prepare an ink receiving layer forming liquid N.

The static surface tension $\gamma_1$ of the ink receiving layer forming liquid N at 25 degrees C. was 36 mN/m, and the viscosity of the ink receiving layer forming liquid N at 25 degrees C. was 12 mPa·s.

Comparative Example 4

A printed matter 36 was obtained in the same manner as in Example 1, except that unlike in Example 1, an ink receiving layer forming liquid O described below was used instead of the ink receiving layer forming liquid A.

<Preparation of Ink Receiving Layer Forming Liquid O>

A urethane acrylic oligomer CN929 (obtained from Sartomer Corporation) (95 parts by mass), and OMNIRAD TPO (obtained from IGM Resins B.V.) (5 parts by mass) serving as an initiator were stirred, to prepare an ink receiving layer forming liquid O.

The static surface tension of the ink receiving layer forming liquid O at 25 degrees C. was 32 mN/m, and the viscosity of the ink receiving layer forming liquid O at 25 degrees C. was 75,000 mPa·s.

As the surface conditions of the base material, "surface roughness" and "wettability" were measured. An arithmetic mean roughness Ra (micrometer) measured with a laser microscope VK-X100 obtained from Keyence Corporation is presented as "surface roughness", and a contact angle (°) between water and the base material measured with a contact angle meter DMS-401 obtained from Kyowa Interface Science, Inc. is presented as "wettability".

TABLE 1

| | | Base material | | | Intermediate layer | | | |
|---|---|---|---|---|---|---|---|---|
| | | | Surface | | | Driving conditions | | Average |
| | | Kind | roughness | Wettability | Material | Temperature (degree C.) | Time (min.) | thickness micrometer |
| Ex. | 1 | Glass plate | 0 | 10 | BONCOAT W-26 | 100 | 30 | 50 |
| | 2 | Glass plate | 0 | 10 | BONCOAT W-26 | 100 | 30 | 50 |
| | 3 | Glass plate | 0 | 10 | BONCOAT W-26 | 100 | 30 | 50 |
| | 4 | Glass plate | 0 | 10 | BONCOAT W-26 | 100 | 30 | 50 |
| | 5 | Glass plate | 0 | 10 | BONCOAT W-26 | 100 | 30 | 50 |
| | 6 | Glass plate | 0 | 10 | BONCOAT W-26 | 100 | 30 | 50 |
| | 7 | Glass plate | 0 | 10 | BONCOAT W-26 | 100 | 30 | 50 |
| | 8 | Glass plate | 0 | 10 | BONCOAT W-26 | 100 | 30 | 50 |
| | 9 | Glass plate | 0 | 10 | BONCOAT W-26 | 100 | 30 | 50 |
| | 10 | Glass plate | 0 | 10 | BONCOAT W-26 | 100 | 30 | 50 |
| | 11 | Glass plate | 0 | 10 | BONCOAT W-26 | 100 | 30 | 50 |
| | 12 | Glass plate | 0 | 10 | BONCOAT W-26 | 100 | 30 | 50 |
| | 13 | Glass plate | 0 | 10 | BONCOAT W-26 | 100 | 30 | 50 |
| | 14 | Glass plate | 0 | 10 | BONCOAT W-26 | 100 | 30 | 50 |
| | 15 | Glass plate | 0 | 10 | BONCOAT W-26 | 100 | 30 | 50 |
| | 16 | Glass plate | 0 | 10 | BONCOAT W-26 | 100 | 30 | 50 |
| | 17 | Glass plate | 0 | 10 | BONCOAT W-26 | 100 | 30 | 50 |
| | 18 | Glass plate | 0 | 10 | BONCOAT W-26 | 100 | 30 | 50 |
| | 19 | White acrylic resin plate | 0 | 90 | BONCOAT W-26 | 50 | 24 (h) | 50 |
| | 20 | MDF plate | 10 | <5 | BONCOAT W-26 | 100 | 30 | 50 |
| | 21 | Decorative low pressure melamine laminate | 0 | 110 | BONCOAT W-26 | 100 | 30 | 50 |
| | 22 | Veneer board | 20 | <5 | BONCOAT W-26 | 100 | 30 | 50 |

TABLE 1-continued

| | Base material | | | Intermediate layer | | | |
|---|---|---|---|---|---|---|---|
| | | Surface | | | Driving conditions | | Average |
| | Kind | roughness | Wettability | Material | Temperature (degree C.) | Time (min.) | thickness micrometer |
| 23 | Aluminum plate | 0 | 80 | BONCOAT W-26 | 100 | 30 | 50 |
| 24 | Glass plate | 0 | 10 | BONCOAT W-26 | 100 | 30 | 50 |
| 25 | Glass plate | 0 | 10 | BONCOAT W-26 | 100 | 30 | 50 |
| 26 | Glass plate | 0 | 10 | BONCOAT W-26 | 100 | 30 | 50 |
| 27 | Glass plate | 0 | 10 | BONCOAT W-26 | 100 | 30 | 50 |
| 28 | Glass plate | 0 | 10 | BONCOAT W-26 | 100 | 30 | 50 |

TABLE 2

| | | Base material | | | Intermediate layer | | | |
|---|---|---|---|---|---|---|---|---|
| | | | Surface | | | Driving conditions | | Average |
| | | Kind | roughness | Wettability | Material | Temperature (degree C.) | Time (min.) | thickness micrometer |
| Ex. | 29 | Glass plate | 0 | 10 | BONCOAT W-26 | 100 | 30 | 50 |
| | 30 | Glass plate | 0 | 10 | BONCOAT W-26 | 100 | 30 | 50 |
| | 31 | Glass plate | 0 | 10 | BONCOAT W-26 | 100 | 30 | 50 |
| | 32 | Glass plate | 0 | 10 | BONCOAT W-26 | 100 | 30 | 50 |
| Comp. | 1 | Glass plate | 0 | 10 | BONCOAT W-26 | 100 | 30 | 50 |
| Ex. | 2 | Glass plate | 0 | 10 | — | — | — | — |
| | 3 | Glass plate | 0 | 10 | BONCOAT W-26 | 100 | 30 | 50 |
| | 4 | Glass plate | 0 | 10 | BONCOAT W-26 | 100 | 30 | 50 |

TABLE 3

| | | Ink receiving layer | | | | | | |
|---|---|---|---|---|---|---|---|---|
| | | Ink receiving layer forming liquid | | | | | | |
| | | Kind | Material | Surfactant | White pigment | Static surface tension $\gamma_1$ (mN/m) | Viscosity (25 degrees C.) (mPa · s) | Average thickness (micrometer) |
| Ex. | 1 | A | 2-Acryloyloxypropyl phthalic acid | — | — | 39 | 16,000 | 25 |
| | 2 | B | 2-Acryloyloxypropyl phthalic acid | BYK-UV-3510 | — | 29 | 16,000 | 25 |
| | 3 | A | 2-Acryloyloxypropyl phthalic acid | — | — | 39 | 16,000 | 25 |
| | 4 | A | 2-Acryloyloxypropyl phthalic acid | — | — | 39 | 16,000 | 25 |
| | 5 | A | 2-Acryloyloxypropyl phthalic acid | — | — | 39 | 16,000 | 50 |
| | 6 | A | 2-Acryloyloxypropyl phthalic acid | — | — | 39 | 16,000 | 25 |
| | 7 | A | 2-Acryloyloxypropyl phthalic acid | — | — | 39 | 16,000 | 25 |
| | 8 | A | 2-Acryloyloxypropyl phthalic acid | — | — | 39 | 16,000 | 25 |
| | 9 | A | 2-Acryloyloxypropyl phthalic acid | — | — | 39 | 16,000 | 25 |
| | 10 | A | 2-Acryloyloxypropyl phthalic acid | — | — | 39 | 16,000 | 25 |
| | 11 | A | 2-Acryloyloxypropyl phthalic acid | — | — | 39 | 16,000 | 25 |
| | 12 | A | 2-Acryloyloxypropyl phthalic acid | — | — | 39 | 16,000 | 25 |
| | 13 | C | 2-Acryloyloxypropyl succinate | BYK-UV-3510 | — | 29 | 160 | 25 |
| | 14 | D | 2-Acryloyloxypropyl succinate | BYK-UV-3510 | ○ | 29 | 300 | 25 |

TABLE 3-continued

| | Kind | Material | Surfactant | White pigment | Static surface tension $\gamma_1$ (mN/m) | Viscosity (25 degrees C.) (mPa · s) | Average thickness (micrometer) |
|---|---|---|---|---|---|---|---|
| | Ink receiving layer — Ink receiving layer forming liquid | | | | | | |
| 15 | E | Urethane acrylic oligomer CN968 1,6-Hexanediol diacrylate SR238F | — | — | 32 | 100 | 25 |
| 16 | F | Urethane acrylic oligomer CN968 Tripropylene glycol diacrylate SR238F | — | — | 32 | 3,500 | 25 |
| 17 | G | Urethane acrylic oligomer CN975 | — | — | 34 | 10,700 | 25 |
| 18 | H | Urethane acrylic oligomer CN929 Tripropylene glycol diacrylate SR238F | — | — | 33 | 20,000 | 25 |
| 19 | A | 2-Acryloyloxypropyl phthalic acid | — | — | 39 | 16,000 | 25 |
| 20 | A | 2-Acryloyloxypropyl phthalic acid | — | — | 39 | 16,000 | 25 |
| 21 | A | 2-Acryloyloxypropyl phthalic acid | — | — | 39 | 16,000 | 25 |
| 22 | A | 2-Acryloyloxypropyl phthalic acid | — | — | 39 | 16,000 | 25 |
| 23 | A | 2-Acryloyloxypropyl phthalic acid | — | — | 39 | 16,000 | 25 |
| 24 | A | 2-Acryloyloxypropyl phthalic acid | — | — | 39 | 16,000 | 25 |
| 25 | A | 2-Acryloyloxypropyl phthalic acid | — | — | 39 | 16,000 | 25 |
| 26 | A | 2-Acryloyloxypropyl phthalic acid | — | — | 39 | 16,000 | 25 |
| 27 | A | 2-Acryloyloxypropyl phthalic acid | — | — | 39 | 16,000 | 0.8 |
| 28 | A | 2-Acryloyloxypropyl phthalic acid | — | — | 39 | 16,000 | 25 |

TABLE 4

| | | Kind | Material | Surfactant | White pigment | Static surface tension $\gamma_1$ (mN/m) | Viscosity (25 degrees C.) (mPa · s) | Average thickness (micrometer) |
|---|---|---|---|---|---|---|---|---|
| | | Ink receiving layer — Ink receiving layer forming liquid | | | | | | |
| Ex. | 29 | J | 2-Acryloyloxypropyl phthalic acid | — | — | 25 | 16,000 | 5 |
| | 30 | K | 2-Acryloyloxypropyl succinate | BYK-UV-3510 | — | 25 | 160 | 5 |
| | 31 | L | Urethane acrylic oligomer CN929 Tripropylene glycol diacrylate SR306F | BYK-UV-3510 | — | 24 | 3,500 | 5 |
| | 32 | M | 2-Acryloyloxypropyl succinate Isobronyl acrylate SR506 | BYK-UV-3510 | — | 24 | 41 | 5 |
| Comp. Ex. | 1 | — | — | — | — | — | — | — |
| | 2 | A | 2-Acryloyloxypropyl phthalic acid | — | — | 29 | 16,000 | 25 |
| | 3 | N | Tripropylene glycol diacrylate SR306H | — | — | 36 | 12 | 25 |

TABLE 4-continued

| | Ink receiving layer | | | | | | |
|---|---|---|---|---|---|---|---|
| | Ink receiving layer forming liquid | | | | | | |
| | Kind | Material | Surfactant | White pigment | Static surface tension $\gamma_1$ (mN/m) | Viscosity (25 degrees C.) (mPa · s) | Average thickness (micrometer) |
| 4 | O | Urethane acrylic oligomer CN929 | — | — | 32 | 75,000 | 25 |

TABLE 5

| | Ink | | | | | | | | | |
|---|---|---|---|---|---|---|---|---|---|---|
| | | | Color ink | | | | | | | |
| | Clear ink (A1) | | Black ink (A1) | | Magenta ink (A2) | | Cyan ink (A3) | | Yellow ink (A4) | |
| | Static surface tension $\gamma_1$ (mN/m) | Viscosity (40 degress C.) (mPa · s) | Static surface tension $\gamma_1$ (mN/m) | Viscosity (40 degress C.) (mPa · s) | Static surface tension $\gamma_1$ (mN/m) | Viscosity (40 degress C.) (mPa · s) | Static surface tension $\gamma_1$ (mN/m) | Viscosity (40 degrees C.) (mPa · s) | Static surface tension $\gamma_1$ (mN/m) | Viscosity (40 degress C.) (mPa · s) |
| Ex. 1 | 24 | 8 | 24 | 10 | 24 | 10 | 24 | 10 | 24 | 10 |
| 2 | 24 | 8 | 24 | 10 | 24 | 10 | 24 | 10 | 24 | 10 |
| 3 | 24 | 8 | 24 | 10 | 24 | 10 | 24 | 10 | 24 | 10 |
| 4 | 24 | 8 | 24 | 10 | 24 | 10 | 24 | 10 | 24 | 10 |
| 5 | 24 | 8 | 24 | 10 | 24 | 10 | 24 | 10 | 24 | 10 |
| 6 | 24 | 8 | 24 | 10 | 24 | 10 | 24 | 10 | 24 | 10 |
| 7 | 24 | 8 | 24 | 10 | 24 | 10 | 24 | 10 | 24 | 10 |
| 8 | 24 | 8 | 24 | 10 | 24 | 10 | 24 | 10 | 24 | 10 |
| 9 | 24 | 8 | 24 | 10 | 24 | 10 | 24 | 10 | 24 | 10 |
| 10 | 24 | 8 | 24 | 10 | 24 | 10 | 24 | 10 | 24 | 10 |
| 11 | 24 | 8 | 24 | 10 | 24 | 10 | 24 | 10 | 24 | 10 |
| 12 | 24 | 8 | 24 | 10 | 24 | 10 | 24 | 10 | 24 | 10 |
| 13 | 24 | 8 | 24 | 10 | 24 | 10 | 24 | 10 | 24 | 10 |
| 14 | 24 | 8 | 24 | 10 | 24 | 10 | 24 | 10 | 24 | 10 |
| 15 | 24 | 8 | 24 | 10 | 24 | 10 | 24 | 10 | 24 | 10 |
| 16 | 24 | 8 | 24 | 10 | 24 | 10 | 24 | 10 | 24 | 10 |
| 17 | 24 | 8 | 24 | 10 | 24 | 10 | 24 | 10 | 24 | 10 |
| 18 | 24 | 8 | 24 | 10 | 24 | 10 | 24 | 10 | 24 | 10 |
| 19 | 24 | 8 | 24 | 10 | 24 | 10 | 24 | 10 | 24 | 10 |
| 20 | 24 | 8 | 24 | 10 | 24 | 10 | 24 | 10 | 24 | 10 |
| 21 | 24 | 8 | 24 | 10 | 24 | 10 | 24 | 10 | 24 | 10 |
| 22 | 24 | 8 | 24 | 10 | 24 | 10 | 24 | 10 | 24 | 10 |
| 23 | 24 | 8 | 24 | 10 | 24 | 10 | 24 | 10 | 24 | 10 |
| 24 | 24 | 8 | 24 | 10 | 24 | 10 | 24 | 10 | 24 | 10 |
| 25 | 24 | 8 | 24 | 10 | 24 | 10 | 24 | 10 | 24 | 10 |
| 26 | 24 | 8 | 24 | 10 | 24 | 10 | 24 | 10 | 24 | 10 |
| 27 | 24 | 8 | 24 | 10 | 24 | 10 | 24 | 10 | 24 | 10 |
| 28 | 24 | 8 | 24 | 10 | 24 | 10 | 24 | 10 | 24 | 10 |

TABLE 6

| | Ink | | | | | | | | | |
|---|---|---|---|---|---|---|---|---|---|---|
| | | | Color ink | | | | | | | |
| | Clear ink (A1) | | Black ink (A1) | | Magenta ink (A2) | | Cyan ink (A3) | | Yellow ink (A4) | |
| | Static surface tension $\gamma_1$ (mN/m) | Viscosity (40 degress C.) (mPa · s) | Static surface tension $\gamma_1$ (mN/m) | Viscosity (40 degress C.) (mPa · s) | Static surface tension $\gamma_1$ (mN/m) | Viscosity (40 degress C.) (mPa · s) | Static surface tension $\gamma_1$ (mN/m) | Viscosity (40 degrees C.) (mPa · s) | Static surface tension $\gamma_1$ (mN/m) | Viscosity (40 degress C.) (mPa · s) |
| Ex. 29 | 30 | 8 | 30 | 10 | 30 | 10 | 30 | 10 | 30 | 10 |
| 30 | 30 | 8 | 30 | 10 | 30 | 10 | 30 | 10 | 30 | 10 |
| 31 | 30 | 8 | 30 | 10 | 30 | 10 | 30 | 10 | 30 | 10 |
| 32 | 30 | 8 | 30 | 10 | 30 | 10 | 30 | 10 | 30 | 10 |

TABLE 7

| | | Ink | | | | | | | | | |
|---|---|---|---|---|---|---|---|---|---|---|---|
| | | | | Color ink | | | | | | | |
| | | Clear ink (A1) | | Black ink (A1) | | Magenta ink (A2) | | Cyan ink (A3) | | Yellow ink (A4) | |
| | | Static surface tension $\gamma_1$ (mN/m) | Viscosity (40 degress C.) (mPa · s) | Static surface tension $\gamma_1$ (mN/m) | Viscosity (40 degress C.) (mPa · s) | Static surface tension $\gamma_1$ (mN/m) | Viscosity (40 degress C.) (mPa · s) | Static surface tension $\gamma_1$ (mN/m) | Viscosity (40 degress C.) (mPa · s) | Static surface tension $\gamma_1$ (mN/m) | Viscosity (40 degress C.) (mPa · s) |
| Comp. | 1 | 24 | 8 | 24 | 10 | 24 | 10 | 24 | 10 | 24 | 10 |
| Ex. | 2 | 24 | 8 | 24 | 10 | 24 | 10 | 24 | 10 | 24 | 10 |
| | 3 | 24 | 8 | 24 | 10 | 24 | 10 | 24 | 10 | 24 | 10 |
| | 4 | 24 | 8 | 24 | 10 | 24 | 10 | 24 | 10 | 24 | 10 |

TABLE 8

| | | Ink | | | | | | |
|---|---|---|---|---|---|---|---|---|
| | | Discharge overlapping period of time (landing time lag) (second) | Liquid droplet volume (pL) | Liquid droplet discharging speed (m/s) | Dot density (dpi) | | Average thickness (micrometer) | |
| | | | | | Color ink | Clear ink | Color ink | Clear ink |
| Ex. | 1 | 1 | 7 | 7 | 300 | 600 | 4 | |
| | 2 | 1 | 7 | 7 | 300 | 600 | 4 | |
| | 3 | 1 | 7 | 9 | 300 | 600 | 4 | |
| | 4 | 1 | 14 | 7 | 300 | 600 | 4 | |
| | 5 | 1 | 7 | 7 | 300 | 600 | 4 | |
| | 6 | 1 | 2.5 | 7 | 600 | 600 | 5.6 | 1.4 |
| | 7 | 1 | 7 | 7 | 300 | 600 | 4 | |
| | 8 | 0.5 | 7 | 7 | 300 | 600 | 4 | |
| | 9 | 1 | 7 | 7 | 300 | 600 | 4 | |
| | 10 | 1 | 7 | 7 | 300 | 600 | 4 | |
| | 11 | 1 | 7 | 7 | 300 | 600 | 4 | |
| | 12 | 1 | 7 | 7 | 300 | 600 | 4 | |
| | 13 | 1 | 7 | 7 | 300 | 600 | 4 | |
| | 14 | 1 | 7 | 7 | 300 | 600 | 4 | |
| | 15 | 1 | 7 | 7 | 300 | 600 | 4 | |
| | 16 | 1 | 7 | 7 | 300 | 600 | 4 | |
| | 17 | 1 | 7 | 7 | 300 | 600 | 4 | |
| | 18 | 1 | 7 | 7 | 300 | 600 | 4 | |
| | 19 | 1 | 7 | 7 | 300 | 600 | 4 | |
| | 20 | 1 | 7 | 7 | 300 | 600 | 4 | |
| | 21 | 1 | 7 | 7 | 300 | 600 | 4 | |
| | 22 | 1 | 7 | 7 | 300 | 600 | 4 | |
| | 23 | 1 | 7 | 7 | 300 | 600 | 4 | |
| | 24 | 1 | 7 | 9.6 | 260 | 260 | 4 | |
| | 25 | 1 | 7 | 4 | 300 | 600 | 4 | |
| | 26 | 1 | 4 | 7 | 300 | 600 | 4 | |
| | 27 | 1 | 7 | 7 | 300 | 600 | 4 | |
| | 28 | 1 | 7 | 7 | 160 | 160 | 4 | |

TABLE 9

| | | Ink | | | | | | |
|---|---|---|---|---|---|---|---|---|
| | | Discharge overlapping period of time (landing time lag) (second) | Liquid droplet volume (pL) | Liquid droplet discharging speed (m/s) | Dot density (dpi) | | Average thickness (micrometer) | |
| | | | | | Color ink | Clear ink | Color ink | Clear ink |
| Ex. | 29 | 1 | 7 | 7 | 300 | 600 | 4 | |
| | 30 | 1 | 7 | 7 | 300 | 600 | 4 | |
| | 31 | 1 | 7 | 7 | 300 | 600 | 4 | |
| | 32 | 1 | 7 | 7 | 300 | 600 | 4 | |

TABLE 9-continued

| | | Ink | | | | | | |
|---|---|---|---|---|---|---|---|---|
| | | Discharge overlapping period of time (landing time lag) (second) | Liquid droplet volume (pL) | Liquid droplet discharging speed (m/s) | Dot density (dpi) | | Average thickness (micrometer) | |
| | | | | | Color ink | Clear ink | Color ink | Clear ink |
| Comp. | 1 | 1 | 7 | 7 | 300 | 600 | 4 | |
| Ex. | 2 | 1 | 7 | 7 | 300 | 600 | 4 | |
| | 3 | 1 | 7 | 7 | 300 | 600 | 4 | |
| | 4 | 1 | 7 | 7 | 300 | 600 | 4 | |

TABLE 10

| | | Time taken from discharging of yellow ink until curing (second) | Time taken from discharging of clear ink until curing (second) | Curing method | Ink discharging order | Presence or absence of heater |
|---|---|---|---|---|---|---|
| Ex. | 1 | 10 | 11 | UV | A0→A1-A4 | Absent |
| | 2 | 10 | 11 | UV | A0→A1-A4 | Absent |
| | 3 | 10 | 11 | UV | A0→A1-A4 | Absent |
| | 4 | 10 | 11 | UV | A0→A1-A4 | Absent |
| | 5 | 10 | 11 | UV | A0→A1-A4 | Absent |
| | 6 | 10 | 11 | UV | A0→A1-A4 | Absent |
| | 7 | 10 | 11 | Electron beam | A0→A1-A4 | Absent |
| | 8 | 10 | 10.5 | UV | A0→A1-A4 | Absent |
| | 9 | 5 | 6 | UV | A0→A1-A4 | Absent |
| | 10 | 10 | 5 | UV | A0→A1-A4 | Absent |
| | 11 | 10 | 11 | UV | A1-A4→A0 | Absent |
| | 12 | 10 | 11 | UV | A0→A1-A4 | Present |
| | 13 | 10 | 11 | UV | A0→A1-A5 | Absent |
| | 14 | 10 | 11 | UV | A0→A1-A6 | Absent |
| | 15 | 10 | 11 | UV | A0→A1-A4 | Absent |
| | 16 | 10 | 11 | UV | A0→A1-A4 | Absent |
| | 17 | 10 | 11 | UV | A0→A1-A4 | Absent |
| | 18 | 10 | 11 | UV | A0→A1-A4 | Absent |
| | 19 | 10 | 11 | UV | A0→A1-A4 | Absent |
| | 20 | 10 | 11 | UV | A0→A1-A4 | Absent |
| | 21 | 10 | 11 | UV | A0→A1-A4 | Absent |
| | 22 | 10 | 11 | UV | A0→A1-A4 | Absent |
| | 23 | 10 | 11 | UV | A0→A1-A4 | Absent |
| | 24 | 10 | 11 | UV | A0→A1-A4 | Absent |
| | 25 | 10 | 11 | UV | A0→A1-A4 | Absent |
| | 26 | 10 | 11 | UV | A0→A1-A4 | Absent |
| | 27 | 10 | 11 | UV | A0→A1-A4 | Absent |
| | 28 | 10 | 11 | UV | A0→A1-A4 | Absent |

TABLE 11

| | | Time taken from discharging of yellow ink until curing (second) | Time taken from discharging of clear ink until curing (second) | Curing method | Ink discharging order | Presence or absence of heater |
|---|---|---|---|---|---|---|
| Ex. | 29 | 10 | 11 | UV | J0→J1-J4 | Absent |
| | 30 | 10 | 11 | UV | J0→J1-J4 | Absent |
| | 31 | 10 | 11 | UV | J0→J1-J4 | Absent |
| | 32 | 10 | 11 | UV | J0→J1-J4 | Absent |

TABLE 11-continued

| | | Time taken from discharging of yellow ink until curing (second) | Time taken from discharging of clear ink until curing (second) | Curing method | Ink discharging order | Presence or absence of heater |
|---|---|---|---|---|---|---|
| Comp. Ex. | 1 | 10 | 11 | UV | A0→A1-A4 | Absent |
| | 2 | 10 | 11 | UV | A0→A1-A4 | Absent |
| | 3 | 10 | 11 | UV | A0→A1-A4 | Absent |
| | 4 | 10 | 11 | UV | A0→A1-A4 | Absent |

Next, the obtained printed matters 33 to 36 of Examples 1 to 32 and Comparative Example 1 to 4 were evaluated in terms of "image quality (color developing density and color developing density unevenness)" and "robustness (fixability, and water resistance/alcohol resistance)" in the manners described below. The evaluation results are presented in Table 12.

<Image Quality (Color Developing Density and Color Developing Density Unevenness)>

Five 10 mm-square solid images were produced with a four-color process black (i.e., black obtained by overlaying four colors of C, M, Y, and K), five positions of each of the five solid image samples were measured with EXACT (obtained from X-rite Inc.), and the average color developing density of the samples was judged according to the criteria described below. The grades C, B, and A represent non-problematic levels for practical use.

<Evaluation Criteria-Color Developing Density>

A: The average color developing density was higher than 1.5.

B: The average color developing density was higher than 1.3 but 1.5 or lower.

C: The average color developing density was higher than 1.1 but 1.3 or lower.

D: The average color developing density was 1.1 or lower.

<Image Quality (Color Developing Density Unevenness)>

Five positions of each of the five solid image samples produced for measurement of the color developing density were measured, and the maximum value and the minimum value of the color developing density of the solid images were extracted and judged according to the criteria described below. The grades C, B, and A represent non-problematic levels for practical use.

<Evaluation Criteria-Color Developing Density Unevenness>

A: The difference between the maximum value and the minimum value of the color developing density was less than 0.02.

B: The difference between the maximum value and the minimum value of the color developing density was 0.02 or greater but less than 0.04.

C: The difference between the maximum value and the minimum value of the color developing density was 0.04 or greater but less than 0.06.

D: The difference between the maximum value and the minimum value of the color developing density was 0.06 or greater.

<Robustness (Fixability)>

The obtained printed matters 1 to 36 were rubbed with nonwoven fabric a hundred times, and subsequently scratched with a fingernail, to evaluate fixability of a solid image over the base material according to the evaluation criteria described below.

<Evaluation Criterial>

B: Neither a scar over the printed surface by rubbing nor peeling from the base material was recognizable.

C: A slight scar over the printed surface by rubbing was recognizable, but peeling from the base material was not recognizable.

D: A scar over the printed surface by rubbing was recognizable, or peeling from the base material was recognizable.

<Robustness (Water Resistance/Alcohol Resistance)>

Water and ethanol (with a purity of 99.5%) were sprayed to the obtained printed matters 1 to 36, and the printed matters were left to stand for 12 hours, to evaluate water resistance and alcohol resistance according to the evaluation criterial described below.

<Evaluation Criteria>

B: Neither color developing density degradation due to contact with the liquids nor peeling from the base material was recognizable.

C: Slight color developing density degradation due to contact with the liquids was recognizable, but peeling from the base material was not recognizable.

D: Color developing density degradation due to contact with the liquids was recognizable, or peeling from the base material was recognizable.

TABLE 12

| | | Evaluation results | | | |
|---|---|---|---|---|---|
| | | Color developing density | Color developing density unevenness | Fixability | Water resistance/ alchol resistance |
| Ex. | 1 | B | B | B | B |
| | 2 | B | B | B | B |
| | 3 | B | B | B | B |
| | 4 | A | A | B | B |
| | 5 | B | B | B | B |
| | 6 | A | A | B | B |
| | 7 | B | B | B | B |
| | 8 | B | B | B | B |
| | 9 | B | B | B | B |
| | 10 | B | B | B | B |
| | 11 | B | B | B | B |
| | 12 | B | A | B | B |
| | 13 | B | B | B | B |
| | 14 | B | B | B | B |
| | 15 | B | B | B | B |
| | 16 | B | B | B | B |
| | 17 | B | B | B | B |
| | 18 | B | B | B | B |
| | 19 | B | B | B | B |
| | 20 | B | B | B | B |
| | 21 | B | B | B | B |
| | 22 | B | B | B | B |
| | 23 | B | B | B | B |

TABLE 12-continued

| | | Evaluation results | | | |
|---|---|---|---|---|---|
| | | Color developing density | Color developing density unevenness | Fixability | Water resistance/ alchol resistance |
| | 24 | B | B | B | B |
| | 25 | B | C | B | B |
| | 26 | C | B | B | B |
| | 27 | B | B | C | B |
| | 28 | C | B | B | B |
| | 29 | B | B | B | B |
| | 30 | B | B | B | B |
| | 31 | B | B | B | B |
| | 32 | B | B | B | B |
| Comp. | 1 | D | D | D | C |
| Ex. | 2 | B | B | D | C |
| | 3 | C | D | B | B |
| | 4 | B | D | B | B |

From the results of Table 6, it was revealed that the printed matters 1 to 32 of Examples 1 to 32 were superior to the printed matters 33 to 36 of Comparative Examples 1 to 4 in dropped ink wettability/spreadability, image quality, and formed image robustness. Moreover, no difference depending on the kind of the base material was recognized in the image quality, and the printing method was found to be independent of the kind of the base material.

Aspects of the present disclosure are, for example, as follows.

<1> A printed matter producing method including:

forming an intermediate layer over a base material;

applying an ink receiving layer forming liquid to the intermediate layer to form an ink receiving layer; and applying an ink to the ink receiving layer by an inkjet method to form an image, wherein the viscosity of the ink receiving layer forming liquid at 25 degrees C. is 40 mPa·s or higher.

<2> The printed matter producing method according to <1>, wherein the viscosity of the ink receiving layer forming liquid at 25 degrees C. is 40 mPa·s or higher but 20,000 mPa·s or lower, and wherein the static surface tension of the ink is 20 mN/m or higher but 100 mN/m or lower.

<3> The printed matter producing method according to <1> or <2>, wherein the ink is applied to at least one selected from the group consisting of the surface and the interior of the ink receiving layer.

<4> The printed matter producing method according to any one of <1> to <3>, wherein the discharging speed at which the ink is discharged is 5 m/s or higher.

<5> The printed matter producing method according to any one of <1> to <4>, wherein the volume per liquid droplet of the ink discharged is 1 pL or higher.

<6> The printed matter producing method according to any one of <1> to <5>, wherein the average thickness of the ink receiving layer is 1 micrometer or greater.

<7> The printed matter producing method according to any one of <1> to <6>, wherein the dot density at which the ink is discharged is 240 dpi×240 dpi or higher.

<8> The printed matter producing method according to any one of <1> to <7>, further including curing, wherein the curing is performed with at least one selected from the group consisting of ultraviolet rays and electron beams.

<9> The printed matter producing method according to any one of <1> to <8>, wherein the ink includes a plurality of inks, wherein overlap between periods of time during which the plurality of inks are discharged is 1 second or shorter.

<10> The printed matter producing method according to any one of <1> to <9>, wherein the ink is irradiated with active energy rays within 10 seconds after the ink is discharged to the ink receiving layer.

<11> The printed matter producing method according to any one of <1> to <10>, wherein a clear ink free of a colorant is discharged to a region other than a region in which the image is formed.

<12> The printed matter producing method according to any one of <1> to <11>, wherein the ink contains a colorant.

<13> The printed matter producing method according to <11> or <12>, wherein the order of applying or discharging the ink receiving layer forming liquid, the ink, and the clear ink is (A) or (B) below, (A) the order of the ink receiving layer forming liquid, the ink, and the clear ink, (B) the order of the ink receiving layer forming liquid, the clear ink, and the ink.

<14> The printed matter producing method according to any one of <1> to <13>, wherein a time lag between a timing to discharge the ink and a timing to discharge the clear ink is within 1 second.

<15> The printed matter producing method according to any one of <11> to <14>, wherein the ink and the clear ink are irradiated with active energy rays within 10 seconds after the ink and the clear ink are discharged.

<16> The printed matter producing method according to any one of <10> to <15>, wherein the ink receiving layer and the ink are heated before irradiated with active energy rays.

<17> The printed matter producing method according to any one of <11> to <16>, wherein the average thickness of a clear ink layer formed of the clear ink is 1 micrometer or greater but 10 micrometers or less.

<18> The printed matter producing method according to any one of <1> to <17>, wherein the ink receiving layer forming liquid contains a pigment.

<19> A printed matter produced by the printed matter producing method according to any one of <1> to <18>, the printed matter including:

the base material;

the intermediate layer; and the ink receiving layer, wherein the average thickness of the ink receiving layer after cured is greater than 1 micrometer.

<20> A printed matter producing apparatus including:

an intermediate layer forming unit configured to form an intermediate layer over a base material;

an ink receiving layer forming unit configured to apply an ink receiving layer forming liquid to the intermediate layer to form an ink receiving layer; and an image forming unit configured to apply an ink to the ink receiving layer by an inkjet method to form an image, wherein the viscosity of the ink receiving layer forming liquid at 25 degrees C. is 40 mPa·s or higher.

The printed matter producing method according to any one of <1> to <18>, the printed matter according to <19>, and the printed matter producing apparatus according to <20> can solve the various problems in the related art and achieve the object of the present disclosure.

REFERENCE SIGNS LIST

10: coating roller
11: head for clear ink
12: head for black
13: head for magenta
14: head for cyan
15: head for yellow
16: discharging head unit
17: heater
18: active energy ray irradiator
19: base material
20: conveyor belt
21: sending roller
22: winding roller
100: printed matter producing apparatus

CITATION LIST

Patent Literature

PTL 1: Japanese Unexamined Patent Application Publication No. 2011-230501

PTL 2: Japanese Unexamined Patent Application Publication No. 2017-13506

The invention claimed is:

1. A printed matter producing method, comprising:

forming an intermediate layer over a base material;

wherein the base material is selected from the group consisting of nonwoven fabric, cloths, leather, wooden materials, metallic sheets, and glass plates;

applying an ink receiving layer forming liquid to the intermediate layer to form an ink receiving layer; and applying an ink to the ink receiving layer by an inkjet method to form an image, wherein a viscosity of the ink receiving layer forming liquid at 25 degrees C. is 40 mPa·s or higher, and wherein an average thickness of the intermediate layer is 0.5 micrometers or greater but 3 micrometers or less.

2. The printed matter producing method according to claim 1, wherein the viscosity of the ink receiving layer forming liquid at 25 degrees C. is 40 mPa·s or higher but 20,000 mPa·s or lower, and wherein a static surface tension γ2 of the ink is 20 mN/m or higher but 100 mN/m or lower.

3. The printed matter producing method according to claim 1, wherein the ink is applied to at least one selected from the group consisting of a surface and an interior of the ink receiving layer.

4. The printed matter producing method according to claim 1, wherein a discharging speed at which the ink is discharged is 5 m/s or higher.

5. The printed matter producing method according to claim 1, wherein a volume per liquid droplet of the ink discharged is I pL.

6. The printed matter producing method according to claim 1, wherein an average thickness of the ink receiving layer is 1 micrometer or greater.

7. The printed matter producing method according to claim 1, wherein a dot density at which the ink is discharged is 240 dpi×240 dpi or higher.

8. The printed matter producing method according to claim 1, further comprising:

curing, wherein the curing is performed with at least one selected from the group consisting of ultraviolet rays and electron beams.

9. The printed matter producing method according to claim 1, wherein the ink includes a plurality of inks, and wherein overlap between periods of time during which the plurality of inks are discharged is 1 second or shorter.

10. The printed matter producing method according to claim 1, wherein the ink is irradiated with active energy rays within 10 seconds after the ink is discharged to the ink receiving layer.

11. The printed matter producing method according to claim 10, wherein the ink receiving layer and the ink are heated before irradiated with active energy rays.

12. The printed matter producing method according to claim 1, wherein a clear ink free of a colorant is discharged to a region other than a region in which the image is formed.

13. The printed matter producing method according to claim 12, wherein an order of applying or discharging the ink receiving layer forming liquid, the ink, and the clear ink is (A) or (B) below, (A) an order of the ink receiving layer forming liquid, the ink, and the clear ink, (B) an order of the ink receiving layer forming liquid, the clear ink, and the ink.

14. The printed matter producing method according to claim 12, wherein a time lag between a timing to discharge the ink and a timing to discharge the clear ink is within 1 second.

15. The printed matter producing method according to claim 12, wherein the ink and the clear ink are irradiated with active energy rays within 10 seconds after the ink and the clear ink are discharged.

16. The printed matter producing method according to claim 12, wherein an average thickness of a clear ink layer formed of the clear ink is 1 micrometer or greater but 10 micrometers or less.

17. The printed matter producing method according to claim 1, wherein the ink receiving layer forming liquid contains a pigment.

18. A printed matter produced by the printed matter producing method according to claim 1, the printed matter comprising:

the base material;

the intermediate layer; and the ink receiving layer, wherein an average thickness of the ink receiving layer after curing is greater than 1 micrometer.

19. A printed matter producing apparatus, comprising:

an intermediate layer forming unit configured to form an intermediate layer over a base material;

wherein an average thickness of the intermediate layer is 0.5 micrometers or greater but 3 micrometers or less:

wherein the base material is selected from the group consisting of nonwoven fabric, cloths, leather, wooden materials, metallic sheets, and glass plates;

an ink receiving layer forming unit configured to apply an ink receiving layer forming liquid to the intermediate layer to form an ink receiving layer; and an image forming unit configured to apply an ink to the ink receiving layer by an inkjet method to form an image, wherein a viscosity of the ink receiving layer forming liquid at 25 degrees C. is 40 mPa·s or higher.

* * * * *